(12) United States Patent
Yamamoto et al.

(10) Patent No.: US 8,869,601 B2
(45) Date of Patent: Oct. 28, 2014

(54) LEVER-TYPE DETECTOR, STYLUS, AND AUTOMATIC STYLUS EXCHANGER

(75) Inventors: Takeshi Yamamoto, Kawasaki (JP); Atsushi Shimaoka, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 928 days.

(21) Appl. No.: 12/976,415

(22) Filed: Dec. 22, 2010

(65) Prior Publication Data
US 2011/0162444 A1    Jul. 7, 2011

(30) Foreign Application Priority Data

Jan. 7, 2010   (JP) .................. 2010-002055
Dec. 3, 2010   (JP) .................. 2010-269929

(51) Int. Cl.
G01B 5/12    (2006.01)
G01B 5/28    (2006.01)
G01B 5/012   (2006.01)

(52) U.S. Cl.
CPC . G01B 5/012 (2013.01); G01B 5/28 (2013.01)
USPC ........................................... 73/105

(58) Field of Classification Search
CPC ........... G01B 5/012; G01B 5/28; G01B 21/30
USPC ......... 73/105; 33/503, 556, 558.3, 558.4, 559
See application file for complete search history.

(56) References Cited

U.S. PATENT DOCUMENTS

| | | | |
|---|---|---|---|
| 6,272,908 B1* | 8/2001 | Boccuzzi et al. | 73/105 |
| 6,295,866 B1 | 10/2001 | Yamamoto et al. | |
| 6,487,897 B1 | 12/2002 | Fujii et al. | |
| 2003/0066354 A1* | 4/2003 | Saito | 73/778 |
| 2004/0163268 A1* | 8/2004 | McMurtry et al. | 33/556 |
| 2010/0011601 A1* | 1/2010 | Funabashi et al. | 33/561 |

FOREIGN PATENT DOCUMENTS

| | | |
|---|---|---|
| JP | A-11-248404 | 9/1999 |
| JP | A-2000-74616 | 3/2000 |

OTHER PUBLICATIONS

Extended European Search Report issued in European Application No. 10197161.2 on May 19, 2011.

* cited by examiner

*Primary Examiner* — Daniel S Larkin
(74) *Attorney, Agent, or Firm* — Oliff PLC

(57) ABSTRACT

A lever-type detector, a stylus, and an automatic stylus exchanger allow styluses of different types to be exchanged automatically and reduce the burden of exchanging the styluses of different types for the lever-type detector. An approximately U-shaped notch is formed in a seating plate provided for a stylus body. In order to attach a stylus to a stylus holder, the longitudinal direction of the stylus body is set in a direction orthogonal to the central axis of a shaft body of the stylus holder, and the seating plate is moved in the direction orthogonal to the central axis of the shaft body. Then, the notch guides the shaft body to the center of gravity of the whole stylus on the seating plate. With the shaft body guided to the center of gravity by the notch, a flat swinging member holds the seating plate detachably.

15 Claims, 21 Drawing Sheets

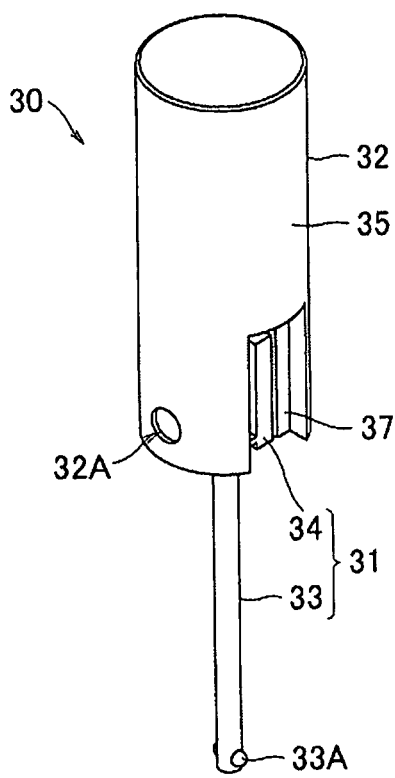
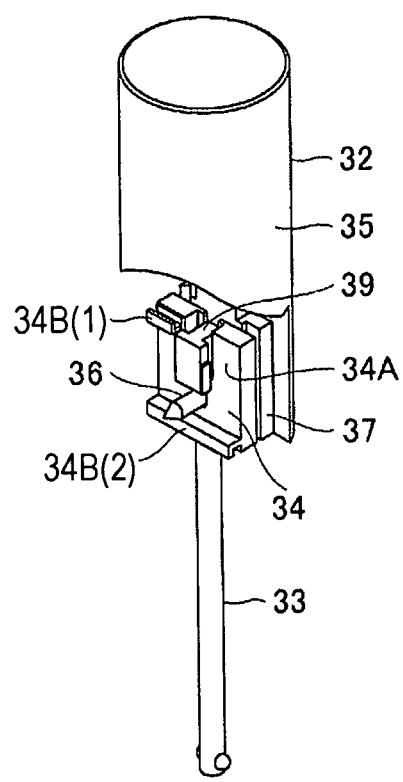

BEFORE ATTACHMENT

AFTER ATTACHMENT

LEVER-TYPE DETECTOR, STYLUS, AND AUTOMATIC STYLUS EXCHANGER

RELATED APPLICATIONS

This application is based on and claims the benefits of priority from Japanese Patent Application No. 2010-002055 filed on Jan. 7, 2010, and Japanese Patent Application No. 2010-269929 filed on Dec. 3, 2010, the entire contents of which are incorporated herein by reference.

FIELD OF THE INVENTION

The present invention relates to lever-type detectors, styluses, and automatic stylus exchangers used in surface-property measuring machines, and more specifically, to improvements to a lever-type detector having a detachable stylus and an automatic stylus exchanger for attaching and detaching the stylus to and from the detector automatically.

BACKGROUND OF THE INVENTION

A known surface roughness tester brings its stylus into contact with the surface of a workpiece, moves the stylus along a surface of the workpiece, detects the displacement of the stylus caused by the surface roughness, and determines the surface roughness from the displacement (refer to Japanese Patent Application Publication No. 2000-74616, for example).

The lever-type detector mounted to the surface roughness tester illustrated in FIGS. 3 and 9 in Japanese Patent Application Publication No. 2000-74616 has a stylus that is brought into contact with the workpiece and a stylus holder that holds the stylus detachably.

Since styluses in various shapes are prepared beforehand for workpiece measurement portions having different shapes, in addition to the usual stylus, the operator of the surface roughness tester exchanges the stylus to one suitable for a workpiece measurement portion before starting measurement. For example, before starting measurement, the operator sets up a bore testing stylus to measure the surface roughness of a bore or sets up a deep-groove testing stylus having a long length to measure the surface roughness of a deep groove.

Besides the surface roughness tester, surface-property measuring machines such as a roundness measuring machine and a contour-shape measuring machine also have styluses in different shapes prepared for various workpiece measurement portions to deal with diversified kinds of measurement.

Conventionally, the operator exchanges the stylus. To do so, the operator temporarily stops the measurement, removes the current stylus from the detector, attaches a new stylus to the detector, and resumes the measurement.

In the conventional stylus exchanging procedure, the operator must stop the measurement temporarily and must detach the current stylus and attach a new one by hand. This interrupts the measurement for a long period of time and places a great deal of burden on the operator who exchanges the stylus. Accordingly, demand for automatic, unattended measurement by surface-property measuring machines has been growing in recent years.

The automatic probe changer used with three-dimensional measuring machines and the like could be applied to a surface-property measuring machine. The measuring machine may be equipped with an exchange rack storing different types of styluses, so that the stylus on the detector can be exchanged automatically.

DISCLOSURE OF THE INVENTION

Problem to be Solved by the Invention

One problem which is common to the conventional manual stylus exchange and the automatic stylus exchange by using the exchange rack is that the exchanged stylus of a different type upsets the lever-type detector and changes the measuring force of the detector. The measuring force is a force exerted on the workpiece by the stylus during measurement. In particular, precise measurement requires balance adjustment of the stylus after it is exchanged. Therefore, the detector must have a mechanism for performing automatic balance adjustment after the stylus is automatically exchanged by using the exchange rack.

In view of the foregoing problems, an object of the present invention is to provide a lever-type detector, a stylus, and an automatic stylus exchanger that allow styluses of different types to be exchanged automatically and reduce the burden of exchanging the styluses of different types for the lever-type detector.

Means to Solve the Problem

The foregoing object is achieved in one aspect of the present invention through the provision of a lever-type detector including a stylus having a contact part that comes into contact with a workpiece; a stylus holder that supports the stylus swingably; and displacement detection means for detecting a swinging displacement of the stylus; and the lever-type detector obtains the swinging displacement of the stylus in order to measure a surface property of the workpiece. The stylus includes a long stylus body having the contact part at a tip end and a seating that is disposed in a base end of the stylus body and is detachable from the stylus holder. The stylus holder includes a shaft body that serves as the center of swinging of the stylus. The seating contains the position of the center of gravity of the whole stylus separated from the stylus holder and has a notch for guiding the shaft body to the center of gravity of the stylus when the stylus is attached. In a state in which the shaft body is guided to the center of gravity through the notch, the seating is detachably held by the stylus holder, and the stylus becomes swingable about the shaft body. The shape of the notch may be an approximately U shape, an approximately V shape, or an approximately L shape, and is not limited.

The shaft body provided for the stylus holder may be supported by the stylus holder rotatably or may be fixed to the stylus holder. In the latter case, a swinging member, described later, rotates about the central axis of the shaft body fixed.

It is preferred in the above-described lever-type detector that the seating of the stylus include a counterbalance for adjusting the position of the center of gravity such that the center of gravity of the whole stylus is placed in the notch of the seating.

It is preferred that the lever-type detector further include styluses of different types prepared for measurement of different portions of the workpiece, each of the styluses have a locking part that can lock a part provided for an exchange rack that accommodates the styluses and allows the styluses to be taken out; and the locking part be disposed in the seating of each of the styluses in a position offset with respect to the counterbalance in the direction of a swinging axis of the shaft body.

The locking part disposed in the seating locks the part provided for the exchange rack. The held stylus is detached from the stylus holder. These two operations are executed in close coordination. More specifically, to detach the stylus from the stylus holder, the stylus holder is moved toward the exchange rack to make the locking part engage with the part provided for the exchange rack. Then, while this engagement is maintained, when the detector is moved away from the exchange rack, the seating is detached from the stylus holder, allowing the stylus to be stored in the exchange rack. Conversely, to mount a stylus to the stylus holder, the stylus holder is moved toward the exchange rack to guide the shaft body of the stylus holder to the center of gravity of the stylus, mounting the seating of the stylus to the stylus holder. Then, the stylus holder is moved in a direction in which the locking condition of the locking part is released to take out the stylus from the exchange rack.

It is preferred in the lever-type detector that the stylus holder include a swinging member supported by the shaft body; in a state in which the shaft body is guided to the center of gravity of the stylus, the swinging member and the seating be placed side by side along the direction of a swinging axis of the shaft body; and the swinging member include an elastic holding member for holding the seating by pressing it against the swinging member with an elastic force and a support for supporting the elastic holding member.

It is preferred that the elastic holding member be rotatably supported by the support at a base end, and when the stylus is attached to the stylus holder, the elastic holding member be pressed at a tip end by the seating, generate elastic deformation while rotating, and use the resultant elastic force to hold the seating by pressing it against the swinging member.

It is preferred that the elastic holding member be cantilevered by the support at a base end, and when the stylus is attached to the stylus holder, the elastic holding member be pressed at a tip end to become far from the swinging member by the seating, generates elastic deformation based on a bend, and use the resultant elastic force to hold the seating by pressing it against the swinging member. In a state in which the stylus is attached to the stylus holder, it is preferred that the seating have the notch located between two protrusions provided for the seating protruding forward the elastic holding member. And the elastic holding member be flat and cantilevered by the support at a base end, and pressed at a tip end to become far from the swinging member by the protrusions.

It is preferred that in a state in which the stylus is attached to the stylus holder, the support be extended in the direction of the swinging axis of the shaft body from the swinging member through the notch and support the elastic holding member at a extended tip end.

It is preferred that at least three balls be placed between the seating and the swinging member in at least three positions that are not in a straight line, and the balls be used to position the seating with respect to the swinging member in the direction of the swinging axis of the shaft body. And it is preferred that at least two of the balls be rotatably supported by the seating, and when the stylus is attached to the stylus holder, the balls roll on a groove formed in the swinging member along the direction in which the shaft body is guided to the center of gravity.

The foregoing object is achieved in another aspect of the present invention through the provision of a stylus detachably attached to the above-described lever-type detector.

The foregoing object is achieved in still another aspect of the present invention through the provision of an automatic stylus exchanger including the above-described lever-type detector; an exchange rack that accommodates styluses of different types prepared for different portions to be measured in a workpiece and allows the styluses to be taken out; a detector drive mechanism for moving the lever-type detector in a direction for approaching or separating from the exchange rack; and a controller. When a stylus exchange command is given, the controller controls the detector drive mechanism and performs a stylus exchange operation between the stylus holder and the exchange rack.

It is preferred that the seating of the styluses be flat, the exchange rack comprise a locked part and a part for preventing. The locked part is projecting in a moving direction of the lever-type detector in order to guide the stylus locked by a locking part disposed in the seating into a accommodating position when the lever-type detector moves in a direction orthogonal to the direction in which the shaft body is guided to the center of gravity of the stylus on a flat face provided for the seating. And in a state in which the stylus is in the accommodating position, the part for preventing the stylus from moving in the direction in which the shaft body is guided to the center of gravity of the stylus. As a result, only the stylus is accommodated by the exchange rack when the lever-type detector moves in a direction in which the shaft body is guided to the center of gravity of the stylus.

It is preferred that the seating of the styluses be flat, the exchange rack comprise a locked part and a part for preventing. The locked part is projecting in a moving direction of the lever-type detector in order to guide the stylus locked by a locking part disposed in the seating into a accommodating position when the lever-type detector moves in a direction in which the shaft body is guided to the center of gravity of the stylus on a flat face provided for the seating. And in a state in which the stylus is in the accommodating position, the part for preventing the stylus from moving in the direction in which the shaft body is guided to the center of gravity of the stylus. The part for preventing is provided so as to move forward and backward between a position for locking the seating in order to prevent the stylus from moving and a position for releasing a lock of the seating. As a result, in a state in which a locking position of the part is kept, only the stylus is accommodated by the exchange rack when the lever-type detector moves in a direction in which the shaft body is guided to the center of gravity of the stylus.

A lever-type detector according to the present invention has a seating integrally formed with a stylus body at a base end of a stylus, opposite to a contact part of the stylus. The seating of the stylus is held by a stylus holder detachably. The stylus body and the seating may be produced separately and then integrated.

According to the present invention, the seating of the stylus has a notch used to guide a shaft body, which serves as a swinging axis of the stylus, to the center of gravity of the stylus. Attachment through the notch allows the shaft body to reach the center of gravity of the stylus. Since the center of gravity of any stylus is placed on the same axis as the shaft body, which is the center of swinging of the lever-type detector, even after the stylus is changed to a different type, the whole stylus, including the swinging member, is kept in good balance, and measurement can be continued with the same measuring force as that used before the exchange. This eliminates the need for stylus balance adjustment after the exchange, especially in precise measurement, and consequently, the detector does not need to include a balance adjustment mechanism.

According to the present invention, the seating has a counterbalance for adjusting the position of the center of gravity to bring the center of gravity of the whole stylus into the notch of the seating. When two styluses differing in stylus length, shape of the contact part, and material are used, if the seating of a first stylus is formed to fit the center of gravity of the first stylus and if the seating formed for a second stylus is the same as the seating for the first stylus, the center of gravity of the second stylus can be set in the same position as set by the seating for the first stylus because of the counterbalance disposed on the seating of the second stylus. The counterbalance allows standardization of the basic shape of the seating among styluses of different types.

According to the present invention, since a lock part provided in the seating is offset in the direction of the swinging axis with respect to the counterbalance of the same seating, the counterbalance can be scaled up or down more freely, and consequently a stylus of a special shape can be produced more easily.

The present invention employs a mechanism for holding the stylus with an elastic force. Since the swinging member is provided with an elastic holding member for holding the seating by pressing it against the swinging member with an elastic force, the stylus holding mechanism can have a simplified configuration and lower weight in comparison with a magnetic holding mechanism.

The elastic holding member has its base end rotatably supported by a support. When the stylus is attached to the stylus holder, it is pressed by the seating at its tip end, exhibits elastic deformation as it rotates, and holds the seating by pressing it against the swinging member with the elastic force. Therefore, the seating can be held by the swinging member just by inserting it, and the seating can be detached from the swinging member just by pulling it. The stylus holding mechanism configured as a so-called toggle joint facilitates the exchange process.

The elastic holding member does not produce an elastic force before its tip is pressed by the seating. When its tip is pressed by the seating, the elastic holding member rotates, exhibiting elastic deformation, and the elastic force exerted on the seating increases gradually. When the elastic holding member is rotated to a predetermined position, the seating is held by the swinging member with a predetermined holding force. With the toggle joint as described here, the seating of the stylus comes into contact with the tip of the elastic holding member, moves a short distance further, and is then completely held by the swinging member. By positioning the seating and the swinging member during the short-distance movement, for example, the stylus can be held after it is accurately positioned.

According to the present invention, the stylus holding mechanism is configured with a simple flat spring mechanism for attachment-detachment of the stylus instead of the toggle joint. Consequently, the stylus holding mechanism can have a still lower weight, improve steadiness of automatic stylus exchanging and usefulness.

According to the present invention, a plurality of balls are provided in at least three positions that are not in a straight line between the seating and the swinging member. With the balls, the seating is positioned with respect to the swinging member, so that the seating is accurately positioned in the direction of the central axis of the shaft body.

Since at least two of the balls are rotatably supported by the seating and are guided along a groove formed in the swinging member, the shaft body is guided accurately to the center of gravity of the stylus. Accordingly, the positional relationship between the swinging member and the seating can be reproduced accurately, and unevenness in measured values caused by exchanging the stylus are reduced.

An automatic stylus exchanger according to the present invention eliminates the need for stylus balance adjustment in automatic exchange, allows measurement to be continued with the same measuring force even after the stylus is exchanged with one of a different type, and has other advantages, as described earlier.

A lever-type detector and a stylus according to the present invention can reduce the burden of manual exchange of a plurality of styluses, and an automatic stylus exchanger according to the present invention can automatically exchange styluses of different types in a lever-type detector.

BRIEF DESCRIPTION OF THE DRAWINGS

FIG. 2A is a perspective view of a detector in the roundness measuring machine, and FIG. 2B is a perspective view showing the internal structure of the detector.

FIG. 6A shows an initial state when the flat spring starts rotating; FIG. 6B shows the flat spring rotated by a predetermined angle; and FIG. 6C shows the flat spring rotated until a predetermined holding power is generated.

FIG. 9A is a perspective view showing a state before the stylus is taken out of the exchange rack. FIG. 9B is a perspective view showing a state after the stylus is taken out.

FIG. 10A shows a state before a stylus is attached, and FIG. 10B shows a state after the attachment.

FIG. 16A is a perspective view showing a state before the stylus is taken out of the stocker. FIG. 16B is a perspective view showing a state in which the stylus is attached to the swinging member. FIG. 16C is a perspective view showing a state after the stylus is taken out of the stocker.

FIG. 17A is a perspective view showing a releasing position. FIG. 17B is a perspective view showing a locking position.

BEST MODE FOR CARRYING OUT THE INVENTION

First Embodiment

Figure 1:
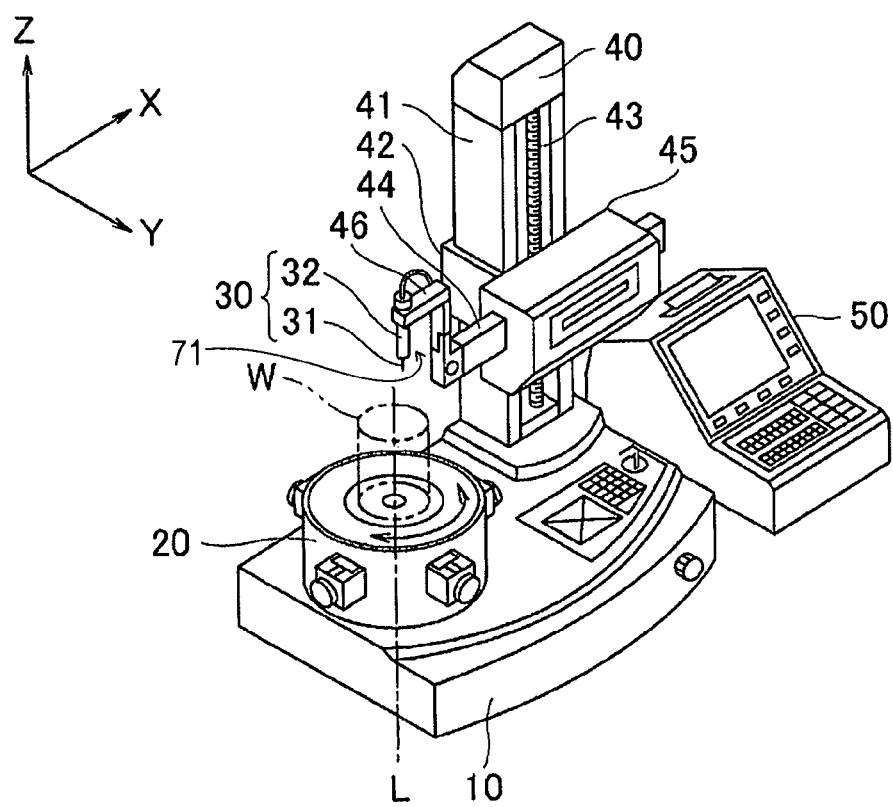
FIG. 1 is a perspective view of a roundness measuring machine according to a first embodiment of the present invention.

FIG. 1 is a perspective view of a roundness measuring machine according to a first embodiment of the present invention.

As shown in FIG. 1, the roundness measuring machine of the first embodiment includes a base 10, a turntable 20 provided on one side of the base 10 to turn about the vertical central axis L and to support a workpiece W on its top surface, a lever-type detector 30, a detector drive mechanism 40 that moves the lever-type detector 30 toward or away from the turntable 20 in the direction of the vertical central axis L and a direction orthogonal to the vertical central axis L, and a controller 50.

The turntable 20 contains a turntable drive mechanism. The turntable drive mechanism can turn the turntable 20 around the vertical central axis L. The turntable drive mechanism includes a motor for turning the turntable 20 or a mechanism for transferring the rotation of a motor through a decelerator to the turntable 20.

The lever-type detector 30 includes a stylus 31 to be brought into contact with the workpiece W and a stylus holder 32 that holds the stylus 31 detachably and detects the displacement of the stylus 31 as an electrical signal. The stylus 31 is supported to swing about a swinging axis provided in the stylus holder 32. Therefore, the detected displacement of the stylus 31 is the amount of rotational displacement of the stylus 31. However, since the amount of displacement is tiny with respect to the turning radius of the stylus 31, the detected displacement becomes the amount of displacement in a direction orthogonal to the longitudinal direction of the stylus 31.

Figure 8:
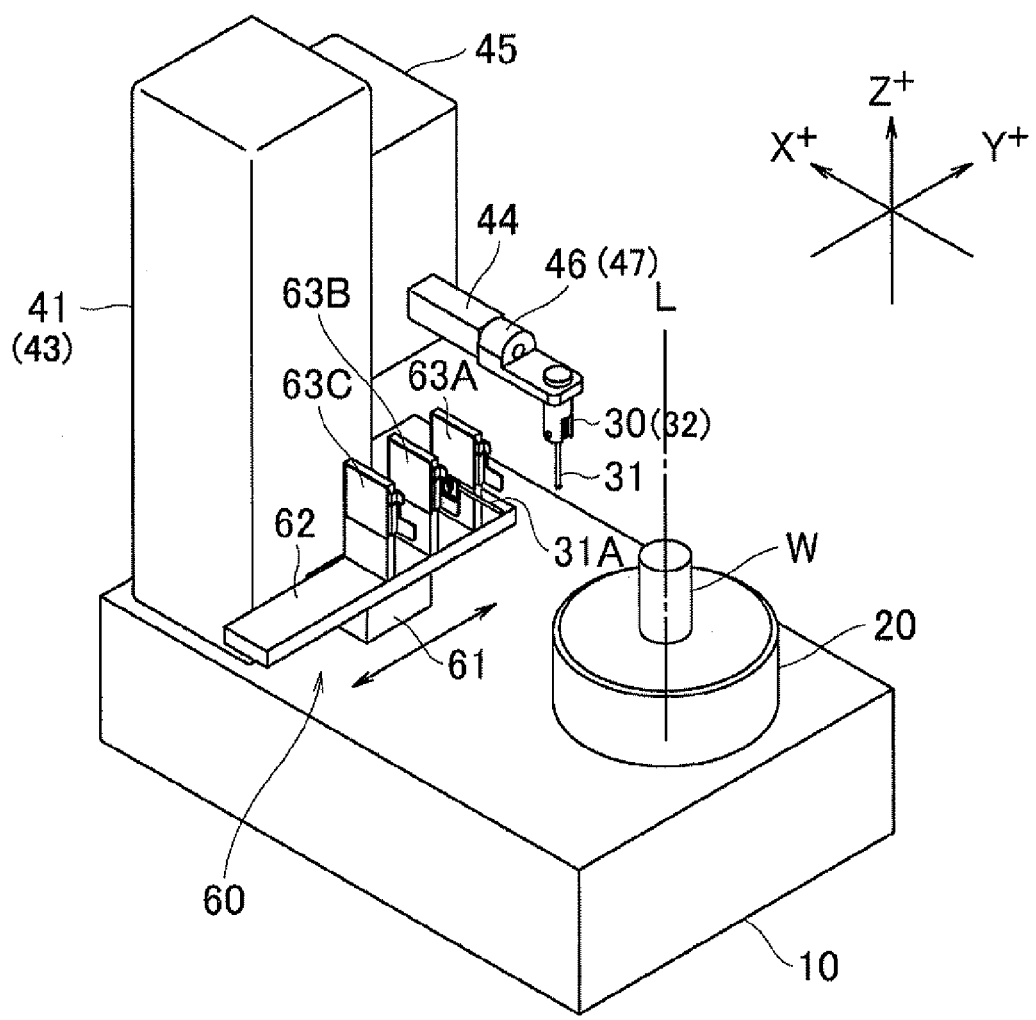
FIG. 8 is a perspective view of the roundness measuring machine shown in FIG. 1 with an exchange rack, seen from a different angle.

The detector drive mechanism 40 includes a column 41 provided upright on the other side of the base 10, a vertical motion drive mechanism 43 that moves a vertical slider 42 in the vertical direction (Z direction) along the column 41, a first horizontal motion drive mechanism 45 that slides a slide arm 44 toward or away from the turntable 20 in the direction (X direction) orthogonal to the vertical central axis L, with respect to the vertical slider 42, a detector arm 46 that is provided at an end of the slide arm 44 to hold the detector 30, and a rotational motion drive mechanism 47 (as shown in FIG. 8) that turns the detector arm 46 around the sliding axis of the slide arm 44 to change the orientation of the detector 30.

The vertical motion drive mechanism 43 can have any structure so long as it can move the vertical slider 42 up and down. For example, the vertical motion drive mechanism 43 can be a feed mechanism that includes a ball thread shaft standing upright in the vertical direction in the column 41, a motor for turning the ball thread shaft, and a nut coupled with the vertical slider 42 engaged with the ball thread shaft.

The first horizontal motion drive mechanism 45 can have any structure so long as it can move the slide arm 44 toward or away from the turntable 20 in the direction orthogonal to the vertical central axis L. For example, the first horizontal motion drive mechanism 45 can be a mechanism in the vertical slider 42, which includes a rack formed along the longitudinal direction of the slide arm 44 and a pinion that engages with the rack, a motor for turning the pinion, and the like.

Operation of the Measuring Machine

When a measurement program stored in a program storage section 51 of the controller 50 gives a measurement command to the controller 50, the detector drive mechanism 40 is driven. The vertical motion drive mechanism 43 and the first horizontal motion drive mechanism 45 move the detector 30 toward the workpiece W, and the stylus 31 of the detector 30 is brought into contact with the workpiece W. When necessary, the rotational motion drive mechanism 47 is operated to change the orientation of the detector 30. If the turntable 20 turns in this state, the stylus 31 of the detector 30 is displaced in accordance with the roundness of the workpiece W. The displacement of the stylus 31 is detected by the stylus holder 32 as an electrical signal and is then taken into the controller 50. The controller 50 stores the measurement data in a data storage section, calculates the roundness from the data, displays the result on a display unit, and prints out the result, if necessary.

Stylus Attachment-Detachment Mechanism of Lever-Type Detector

A characteristic stylus attachment-detachment mechanism of the detector 30 according to the present invention will be described with reference to FIGS. 2A to 7B. FIG. 2A shows a perspective view of the detector 30, and FIG. 2B shows the internal structure.

As shown in FIG. 2A, in the detector 30, the stylus 31 is supported to swing about a swing bearing 32A disposed in the stylus holder 32. The detector 30 also has a mechanism for attaching and detaching the stylus 31. Accordingly, as shown in FIG. 2B, the detector 30 has a flat swinging member 37 that is supported to turn around a shaft body 36, which serves as a swinging axis. The flat swinging member 37 is configured to hold the stylus 31 detachably.

Figure 3A:
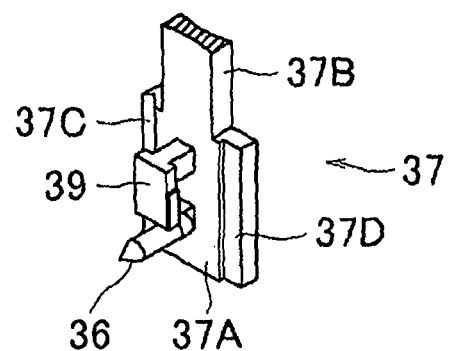
FIG. 3A is a perspective view of a swinging member of the detector.
Figure 3B:
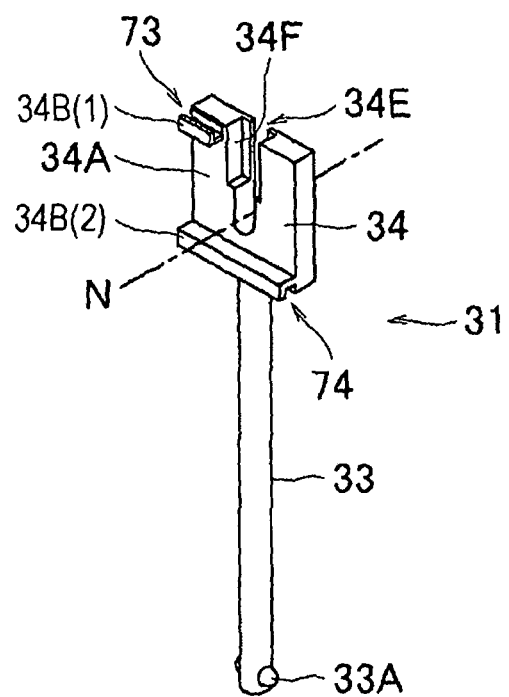
FIGS. 3B and 3C are perspective views of a stylus from different angles.
Figure 3C:
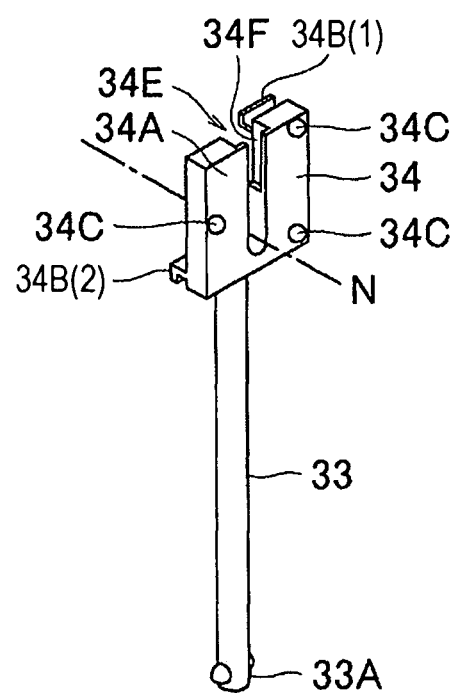

FIGS. 3B and 3C show perspective views of the stylus 31 from different angles. The stylus 31 includes a long stylus body 33 having a contact part 33A at its tip end and a seating plate 34 integrally formed with the base end of the stylus body 33.

The stylus body 33 has a long cylindrical shape and two cemented carbide balls, which are contact parts 33A, fixed in one end of the cylinder. The two cemented carbide balls are half buried in the side face of the cylinder end at intervals of 180 degrees. The illustrated stylus 31 is just one example of various styluses. The stylus bodies 33 of the various styluses 31 have different longitudinal lengths and different cylindrical diameters. Some styluses have just a single cemented carbide ball buried at the cylinder end as the contact part 33A. The shape of the contact parts 33A is not limited to a sphere and can be a circular cone having a spherical tip. The material of the contact parts 33A can be sapphire or the like.

The seating plate 34 is an approximately rectangular plate, and its central axis and the central axis of the stylus body 33 lie on a single straight line. The seating plate 34, which corresponds to a seating in the present invention, includes a body 34A, two locking parts 34B(1), 34B(2) having different lengths, and three steel positioning balls 34C (see FIG. 3C).

Figure 7A:
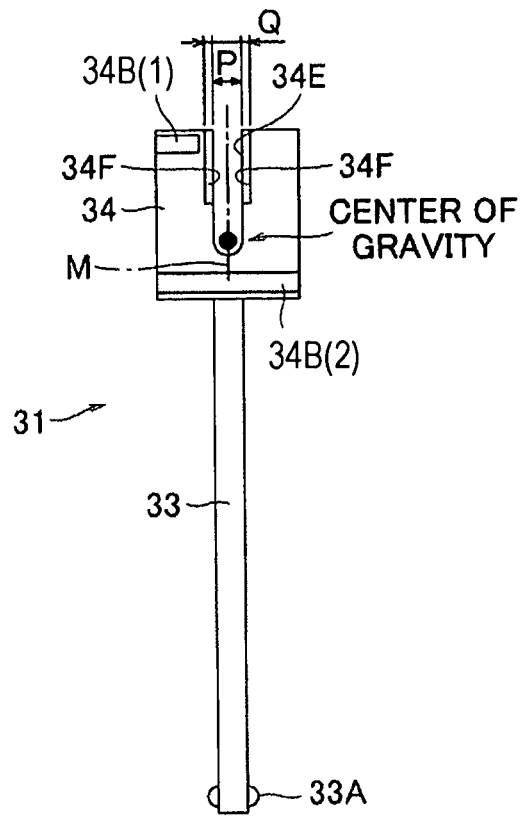
FIGS. 7A and 7B illustrate the positions of the centers of gravity in different types of styluses.

As shown in FIG. 7A, the shape of the seating plate 34 is determined so as to place the center of gravity of the whole stylus 31, which includes both the seating plate 34 and the stylus body 33, over the seating plate 34. The center of gravity of the stylus 31 is indicated by a black dot in FIG. 7A.

The body 34A of the seating plate 34 has an approximately U-shaped notch 34E in its flat face. The notch 34E is formed to enclose the center of gravity of the stylus 31, as shown in FIG. 7A. In other words, the center of gravity of the whole stylus 31 is positioned in the approximately U-shaped notch 34E. The width P in the direction orthogonal to the central axis M of the notch 34E is greater than the diameter of the cylindrical shaft body 36 of the stylus holder 32. Since the central axis M of the notch 34E and the central axis of the stylus body 33 lie on a single straight line, when the stylus 31 is attached to the stylus holder 32, the notch 34E can guide the shaft body 36 to the center of gravity. The notch 34E in this embodiment is approximately U-shaped but can have any shape, such as an approximate V shape or an approximate L shape, so long as the shaft body 36 can be guided to the center of gravity.

As shown in FIGS. 3B and 3C, an axis N is set to pass through the center of gravity of the whole stylus 31 and is parallel to the thickness direction of the seating plate 34. With respect to the axis N of the center of gravity, the notch 34E is formed by cutting the seating plate 34 from a side thereof (above in the figure) to the axis N of the center of gravity of the stylus until the axis N of the center of gravity penetrates through the seating plate 34 without touching the body 34A.

The notch 34E has a pair of depressed parts 34F in two sides facing each other inside the U shape. The width Q of the pair of depressed parts 34F is greater than the width P of the notch 34E (see FIG. 7A). The depressed parts 34F are formed along the central axis M of the notch 34E, not along the whole notch but from an upper opening in FIG. 7A to approximately the center of the notch 34E. As shown in FIGS. 3B and 3C, the depressed parts 34F are formed along the axis N of the center of gravity, not across the entire thickness of the seating plate 34 but from the surface in which the locking parts 34B(1), 34B(2) are provided to a position of about 80% of the thickness of the seating plate 34. Therefore, as shown in an enlarged view in FIG. 6C, the depressed parts 34F have first internal faces 34G and second internal faces 34H. The first internal faces 34G of the depressed parts 34F are orthogonal to the central axis M of the notch 34E, and the second internal faces 34H are orthogonal to the axis N of the center of gravity of the stylus 31.

As shown in FIG. 3C, the positioning balls 34C are rotatably supported in one flat face of the seating plate 34. The three positioning balls 34C are placed in three different positions, and two of them are placed on one side of the notch 34E, and another one of them is placed on another side of the notch 34E. In the state in which the seating plate 34 is put into the stylus holder 32 and the stylus 31 is attached, the three steel positioning balls 34C come between the seating plate 34 and the flat swinging member 37 of the stylus holder 32. Therefore, the three positioning balls 34C function as positioning means for positioning the seating plate 34 with respect to the flat swinging member 37 in the direction of the central axis of the shaft body 36 and for maintaining the parallel relationship between the seating plate 34 and the flat swinging member 37.

The two positioning balls 34C are placed side by side parallel to the central axis M (see FIGS. 7A and 7B) of the approximately U-shaped notch 34E. When the stylus 31 is attached, the two positioning balls 34C roll along a V-shaped groove 37C formed in the flat swinging member 37 of the stylus holder 32.

The single positioning ball 34C disposed on the other side of the notch 34E in the seating plate 34 rolls along a positioning flat face 37D formed parallel to the V-shaped groove 37C.

Figure 6A:
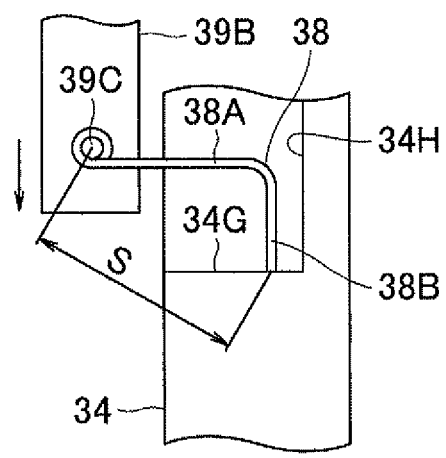
FIGS. 6A to 6C are enlarged partial sectional views of an area I in FIG. 4B.
Figure 6B:
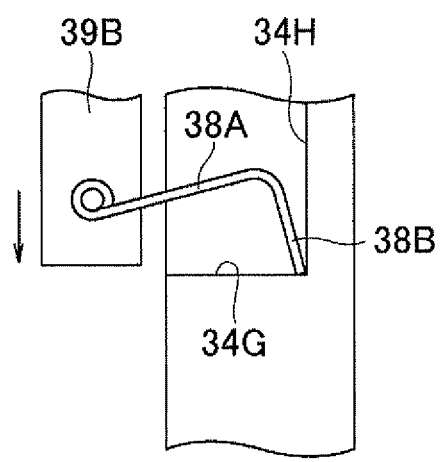
Figure 6C:
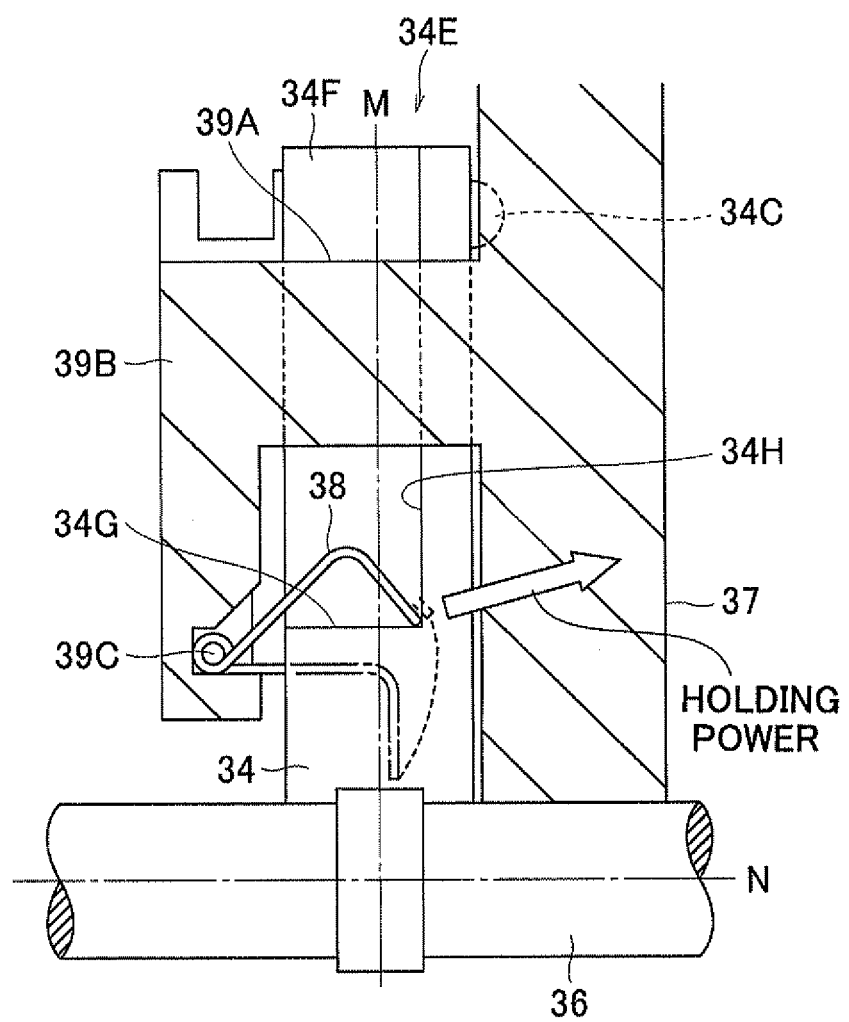

As shown in FIGS. 2A and 2B, the stylus holder 32 includes a holder body 35, the shaft body 36, which is supported by the holder body 35, the flat swinging member 37, which can turn around the shaft body 36, a flat spring 38 (as shown in FIG. 6C) for holding the seating plate 34 of the stylus 31 by an elastic force, a flat spring support 39 for supporting the flat spring 38, displacement detection means 71 (as shown in FIG. 1) for detecting the angular displacement of the flat swinging member 37, and turning force providing means for providing a turning force to the flat swinging member 37.

The holder body 35 is approximately cylindrical and has a hollow internal space where the flat swinging member 37, the displacement detection means 71, and the turning force providing means are placed. The base end (upper end in the figure) of the approximate cylinder is fixed to the detector arm 46 shown in FIG. 1. The other end of the approximate cylinder has a notch having an approximately U-shaped cross section so that the flat swinging member 37 and the stylus 31 turning together about the shaft body 36 do not touch it. The approximately U-shaped cross section is the cross-sectional shape of the holder body 35 cut away in a plane parallel to both the central axis of the approximately cylindrical holder body 35 and the swinging axis of the shaft body 36.

The central axis of the shaft body 36 is parallel to a direction orthogonal to the central axis of the holder body 35. The shaft body 36 is supported rotatably near the other end of the holder body 35. The shaft body 36 may be supported in a fixed position by the holder body 35. In that case, the flat swinging member 37 is supported to rotate about the central axis of the shaft body 36.

Figure 4A:
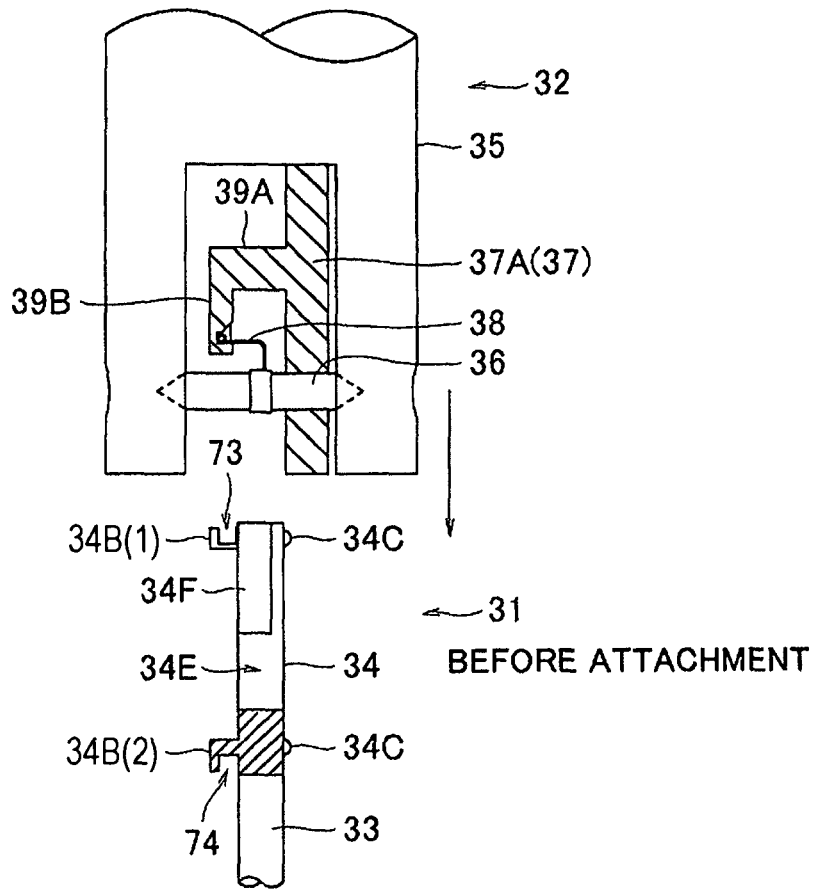
FIG. 4A is a partial sectional view of the detector before the stylus is attached to a stylus holder.
Figure 4B:
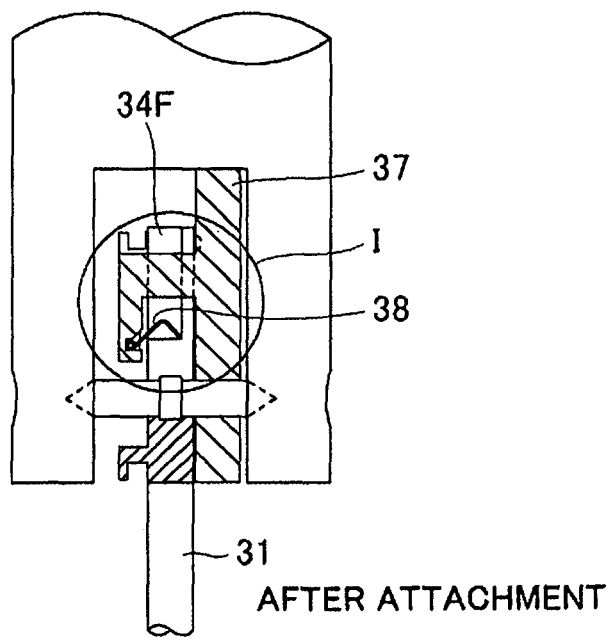
FIG. 4B is a partial sectional view after the stylus is attached.

FIG. 3A shows a perspective view of the flat swinging member 37. FIG. 4A shows a partial sectional view of the flat swinging member 37 and the seating plate 34 before the stylus 31 is attached to the stylus holder 32. FIG. 4B shows another partial sectional view after the stylus 31 is attached.

The flat swinging member 37 includes a wide plate 37A where the stylus 31 is attached and the shaft body 36 is fixed and a narrow plate 37B (as shown in FIG. 3A) integrally formed with the wide plate 37A. After attachment, as shown in FIG. 4B, the wide plate 37A and the seating plate 34 are placed side by side in the longitudinal direction of the shaft body 36.

The rotational displacement of the narrow plate 37B is detected by the displacement detection means 71. A differential transformer is used as the displacement detection means 71. Any device that does not apply a load on the stylus 31, such as a distortion gauge or a capacitance sensor, may also be used.

The turning force providing means gives the narrow plate 37B a turning force, causing it to turn around the shaft body 36. A spring is used as the turning force providing means. An electric motor or an actuator that includes a voice coil formed of a magnet and a coil may also be used.

Figure 5:
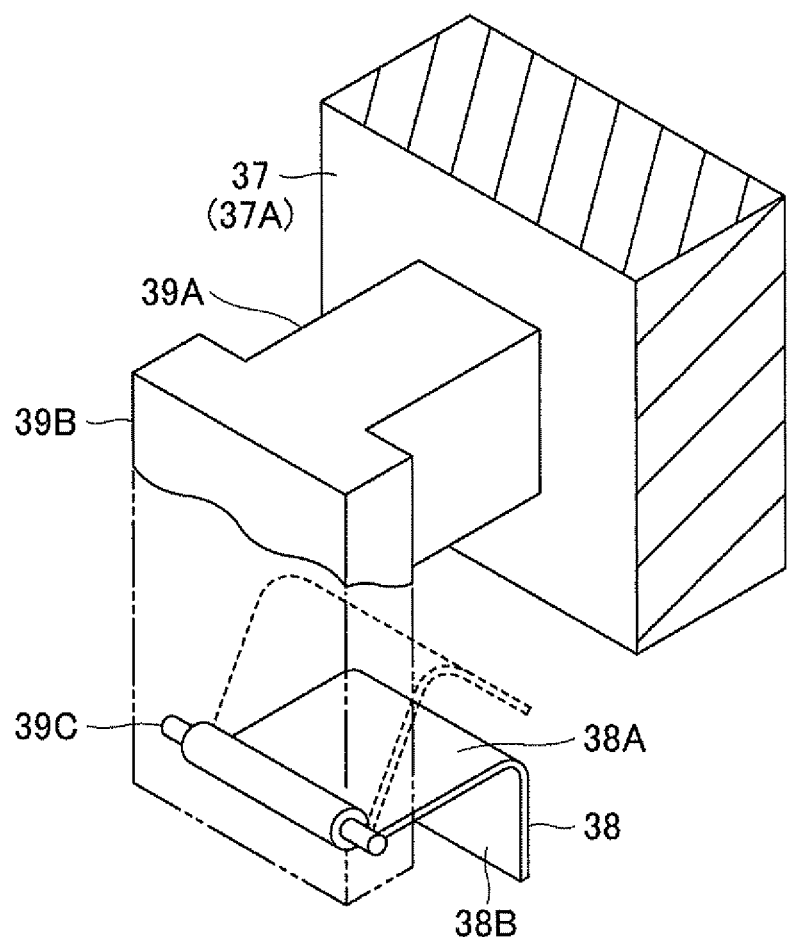
FIG. 5 is a perspective view showing a flat spring of the stylus holder supported by the swinging member.

As shown in FIG. 3A, the flat spring support 39 is formed continuously from the wide plate 37A. The position of the flat spring support 39 is a position in the wide plate 37A, on the narrow plate 37B side of the shaft body 36. As shown in the cross-sectional view in FIG. 4A, the flat spring support 39 includes a first supporting member 39A that extends from the wide plate 37A in the longitudinal direction of the shaft body 36 and a second supporting member 39B that extends toward the shaft body 36, like a cantilever, from the projecting end of the first supporting member 39A. As shown in FIG. 5, a flat spring shaft material 39C is fixed at the tip of the second supporting member 39B to support the flat spring 38 rotatably. The flat spring shaft material 39C is parallel to a direction orthogonal to the swinging axis of the flat swinging member 37 and is also parallel to the width direction of the wide plate 37A.

The flat spring 38 includes a first spring part 38A and a second spring part 38B and has an approximately L-shaped bend. One end of the first spring part 38A is wound around the flat spring shaft material 39C of the flat spring support 39 by almost a single winding so that the flat spring 38 can rotate around the flat spring support 39.

In the state before the stylus 31 is attached, the first spring part 38A extends from the flat spring shaft material 39C toward the wide plate 37A, as indicated by a solid line in FIG. 5, and the second spring part 38B extends from the other end of the first spring part 38A toward the shaft body 36, parallel to the surface of the wide plate 37A.

Operation of Stylus Attachment-Detachment Mechanism

The operation of the attachment-detachment mechanism will be described with reference to FIGS. 4A, 4B, 6A, 6B, and 6C. FIGS. 6A to 6C are enlarged views of the area I in FIG. 4B.

As shown in FIGS. 4A and 4B, attachment of the stylus 31 by moving the stylus holder 32 toward the stylus 31 at rest, will now be described. If the operator were attaching the stylus 31 by hand, he would bring the stylus 31 toward the stylus holder 32 at rest, but the operation of the attachment-detachment mechanism is substantially the same.

As shown in FIG. 4A, the stylus holder 32 is placed first in such a position with respect to the stylus 31 that the central axis of the approximately cylindrical holder body 35 and the central axis M of the notch 34E of the stylus 31 (see FIG. 7A) lie on a single straight line and that the swinging axis of the shaft body 36 becomes parallel to the axis N of the center of gravity of the stylus 31.

The stylus holder 32 is moved toward the stylus 31, and the shaft body 36 is inserted into the upper opening of the notch 34E in the seating plate 34. In this process, if the positioning balls 34C on the seating plate 34 are rolled on the V-shaped groove 37C and the positioning flat face 37D of the flat swinging member 37, the shaft body 36 is guided smoothly along the approximately U-shaped notch 34E to the center of gravity of the stylus 31, without touching the seating plate 34.

The seating plate 34 is placed between the wide plate 37A of the flat swinging member 37 and the second supporting member 39B of the flat spring support 39. Following the shaft body 36, the first supporting member 39A of the flat spring support 39 is inserted into the approximately U-shaped notch 34E (FIG. 4B).

As shown in FIG. 6A, before the shaft body 36 reaches the center of gravity of the stylus 31, the tip of the flat spring 38 (tip of the second spring part 38B) comes into contact with the first internal faces 34G formed in the depressed parts 34F of the notch 34E. The tip of the flat spring 38 is pushed by the first internal faces 34G, and the flat spring 38 starts rotating around the flat spring shaft material 39C. After the flat spring 38 rotates by a predetermined angle, the tip of the flat spring 38 comes into contact with the second internal faces 34H (FIG. 6B) as well. The tip of the flat spring 38 moves to the corners between the first internal faces 34G and the second internal faces 34H. If the tip of the flat spring 38 is pushed further by the first internal faces 34G, elastic deformation of the flat spring 38 starts, and the angle formed by the first spring part 38A and the second spring part 38B decreases gradually.

As shown in FIG. 6A, let the distance between the center of rotation of the flat spring 38 and the tip of the flat spring 38 be S. In the state in which the shaft body 36 is guided to the center of gravity of the stylus 31 (FIG. 6C), the distance S decreases, and a certain amount of elastic deformation is obtained. As shown in FIG. 6A, since the line connecting the center of rotation of the flat spring 38 and the tip of the flat spring 38 is approximately orthogonal to the flat face of the flat swinging member 37, the elastic force of the flat spring 38 presses the seating plate 34 against the flat swinging member 37 and generates a holding force, as indicated by an arrow.

While the seating plate 34 is being inserted, the flat spring 38 can have two states, pressing the seating plate 34 and not pressing the seating plate 34, so that the flat swinging member 37 can stably hold the seating plate 34 by the elastic force of the flat spring 38.

When the seating plate 34 is pulled from the space between the flat swinging member 37 and the second supporting member 39B, the flat spring 38 works in reverse. The seating plate 34 is detached from the flat swinging member 37, and the stylus 31 can be easily removed from the stylus holder 32.

According to the present embodiment, because the shaft body 36 passes the approximately U-shaped notch 34E formed in the seating plate 34 when the stylus is attached, the shaft body 36 can reach the center of gravity of the stylus 31. That is, if the stylus 31 is attached to the stylus holder 32, the center of gravity always lies on the same axis as the shaft body 36, regardless of the type of stylus 31. Accordingly, even if the stylus 31 of a different type is attached to the flat swinging member 37, the whole stylus 31, including the flat swinging member 37, is kept in good balance, and the measurement can be continued with the same measuring force as before the exchange. This eliminates the need for balance adjustment of the stylus 31 after the stylus is exchanged in precise measurement.

The seating plate 34 can be held by the flat swinging member 37 just by inserting it and can be detached from the flat swinging member 37 just by pulling it. The stylus 31 is detachable from the stylus holder 32. Since the flat swinging member 37 can hold the seating plate 34 by the elastic force of the flat spring 38, the mechanism for holding the stylus 31 can have a simplified configuration and less weight in comparison with a magnetic holding mechanism.

At the attachment of the stylus 31, when the tip of the flat spring 38 is first pressed by the first internal faces 34G of the seating plate 34, the flat spring 38 starts to elastically deform while rotating, and the generated elastic force presses the second internal faces 34H of the seating plate 34 against the flat swinging member 37. Since the mechanism for holding the stylus 31 is configured as a so-called toggle joint, the stylus 31 can be exchanged easily.

This type of toggle joint does not produce the elastic force of the flat spring 38 before the tip of the flat spring 38 comes into contact with the second internal faces 34H. After the flat spring 38 comes into contact with the second internal faces 34H, the stylus holder 32 advances a short distance further, and then the elastic force pressing the second internal faces 34H is maximized, completing the process of holding the stylus 31. Since the seating plate 34 and the flat swinging member 37 can be positioned while the stylus holder 32 is advancing the short distance, the stylus 31 can be held in the stylus holder 32 after it is positioned accurately.

In the positioning of the stylus 31 for attachment, the three positioning balls 34C placed in at least three different positions, not in a straight line, between the seating plate 34 and the flat swinging member 37 are used to position the seating plate 34 with respect to the flat swinging member 37. Therefore, the shaft body 36 can be positioned accurately in the direction of the central axis.

During attachment, two of the three balls 34C are guided along the V-shaped groove 37C of the flat swinging member 37, so that the shaft body 36 can be guided accurately to the center of gravity of the stylus 31. In other words, the central axis of the shaft body 36 agrees with the axis N of the center of gravity of the stylus 31, and the positional relationship between the flat swinging member 37 and the seating plate 34 before the exchange can be reproduced accurately.

The number of positioning balls 34C is not limited to three. At least three balls 34C should be placed in three different positions, not in a straight line. At least two of the balls 34C should be provided to roll along the V-shaped groove 37C.

The positioning balls 34C need not be provided rotatably on the seating plate 34; they may be press-fitted or bonded to the seating plate 34.

Figure 7B:
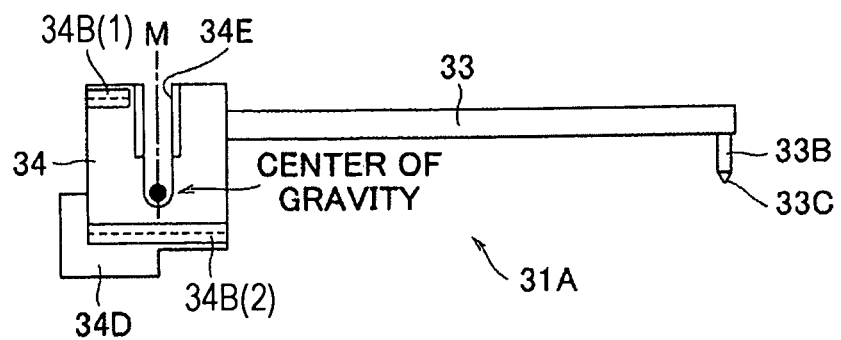

FIG. 7B shows the position of the center of gravity of a different stylus 31A like FIG. 7A. The stylus 31A has an approximately U-shaped notch 34E in a direction orthogonal to the longitudinal direction of the stylus body 33, but the basic shape of a seating plate 34 is the same as that of the seating plate 34 in FIG. 7A. The seating plate 34 of the stylus 31A has a counterbalance 34D for adjusting the position of the center of gravity so that the center of gravity of the whole stylus 31A is placed in the notch 34E of the seating plate 34. Since the center of gravity of the stylus of any type can be adjusted with the counterbalance 34D disposed on the seating plate 34, the basic shape of the seating plate 34 can be standardized for different types of styluses.

The stylus 31A shown in FIG. 7B is called a crank stylus and is useful for measuring the internal surface of a narrow circumferential groove. In the crank stylus, the stylus body 33 has a small-diameter, short rod 33B at its tip, orthogonally to the stylus body 33, and a contact part 33C is formed in the end of the short rod 33B. The shape of the contact part $33c$ is a circular cone shape having a sphere at the tip.

Automatic Stylus Exchanger

Automatic exchange of the stylus 31 of the detector 30 will be described next.

FIG. 8 is a perspective view of the roundness measuring machine shown in FIG. 1 with an exchange rack 60 mounted thereto, seen from a different angle. This roundness measuring machine differs from the machine shown in FIG. 1 in the shape of the detector arm 46, but has the same basic configuration as the machine shown in FIG. 1 and uses an automatic stylus exchanger according to the present invention.

Figure 9A:
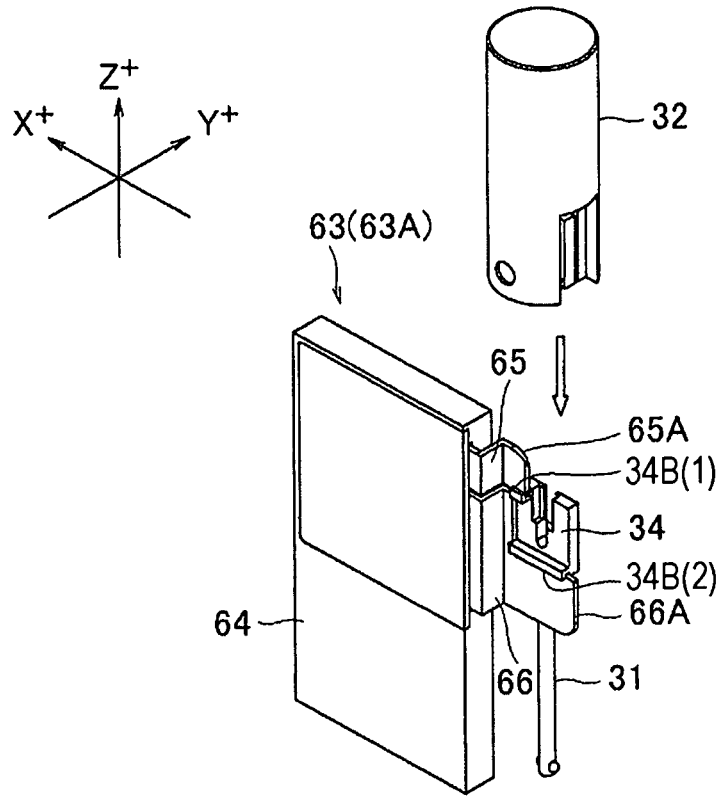
FIGS. 9A and 9B are views illustrating a procedure for exchanging the stylus in the machine shown in FIG. 8.
Figure 9B:
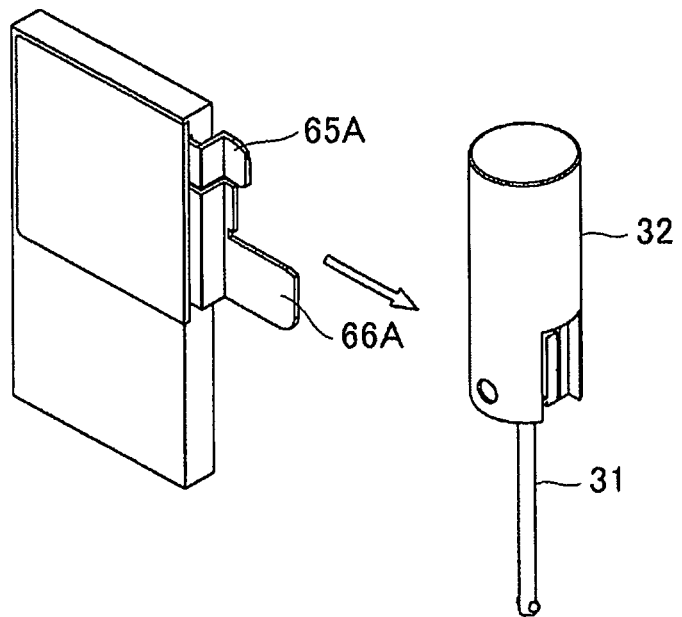

FIGS. 9A to 9C illustrate a procedure for exchanging the stylus 31. FIG. 9A shows a perspective view before the stylus 31 is taken out from the exchange rack 60, and FIG. 9B shows a perspective view after the stylus 31 is taken out.

As shown in FIG. 8, the exchange rack 60 is disposed on the base 10 between the turntable 20 and the column 41. The vertical motion drive mechanism 43 and the first horizontal motion drive mechanism 45 are configured to move the detector 30 to the position of the exchange rack 60.

The exchange rack 60 includes a rack base 61, a rack slider 62 that slides in the Y direction on the rack base 61, and three stockers 63 standing upright on the rack slider 62. In FIG. 8, a first stocker 63A is positioned at an attachment-detachment location. As the rack slider 62 moves, a second stocker 63B and a third stocker 63C can be positioned at the location one at a time. The second stocker 63B stores the different stylus 31A.

As shown in FIG. 9A, each stocker 63 includes a rectangular stocker body 64 standing upright on the rack slider 62 and an upper support 65 and a lower support 66 fixed on the stocker body 64. The upper support 65 forms a part provided for preventing the stylus 31 from moving in the present invention. The lower support 66 forms a locked part in the present invention. The upper support 65 has an upper projecting plate 65A projecting in the negative X direction, and the lower support 66 has a lower projecting plate 66A projecting in the same direction. The lower projecting plate 66A has a greater projection length than the upper projecting plate 65A. The two projecting plates 65A and 66A are disposed with a predetermined space placed between them in the Z direction. The two projecting plates are locked by the pair of upper and lower locking parts 34B(1), 34B(2) provided on the seating plate 34 of the stylus 31.

As shown in FIG. 3B, the seating plate 34 of the stylus 31 has an upper groove 73 and a lower groove 74. The grooves 73 and 74 are made by forming locking parts 34B(1), 34B(2) having an L-shaped cross section integrally with the body 34A of the seating plate 34.

The pair of locking parts 34B(1), 34B(2) project in the direction of the axis N of the center of gravity from the flat face of the seating plate 34 opposite to the flat face supporting the positioning balls 34C. In other words, each locking part 34B(1), 34B(2) is offset from the body 34A of the seating plate 34 in the direction of the central axis of the shaft body 36. The two locking parts 34B(1), 34B(2) have different lengths. The longer locking part 34B(2) is disposed at a location in the negative Z direction of the seating plate 34, and the shorter locking part 34B(1) is disposed at another location in the positive Z direction, with a predetermined space placed between them. The longitudinal direction of each locking part 34B(1), 34B(2) is parallel to a direction orthogonal to the central axis of the approximately U-shaped notch 34E.

When the upper projecting plate 65A and lower projecting plate 66A of one of the stockers 63 are inserted into the upper groove 73 and the lower groove 74, formed as described above, of the stylus 31, the movement of the stylus 31 in the Z direction is restricted. Therefore, when the stylus holder 32 moves in the positive Z direction, just the stylus 31 can be stored in the stocker 63.

Since the locking parts 34B(1), 34B(2) in the seating plate 34 of the stylus 31 are offset in the direction of the axis N of the center of gravity with respect to the body 34A of the seating plate 34, the size of the counterbalance 34D can be determined more freely, therefore, the stylus 31A, which has a special shape as shown in FIG. 7B, can be produced easily.

Automatic Stylus Exchange Operation

When an automatic stylus exchange program stored in the program storage section gives a stylus exchange command to the controller 50, the detector drive mechanism 40 is driven. The vertical motion drive mechanism 43, the first horizontal motion drive mechanism 45, and the rotational motion drive mechanism 47 move the detector 30, and the stylus exchange operation between the stylus holder 32 and the exchange rack 60 is executed.

As shown in FIG. 8, for example, suppose that the stylus exchange command is given when the stylus 31 is attached to the detector 30. If the orientation of the detector 30 is not vertical, the rotational motion drive mechanism 47 turns the detector 30 to make it vertical. The vertical motion drive mechanism 43 positions the detector 30 to the height of the stocker 63 to which the stylus 31 is to be stored, of the exchange rack 60, and the following operation is performed.

(A) The first horizontal motion drive mechanism 45 moves the detector 30 toward the stocker 63 in the positive X direction to bring the upper groove 73 and the lower groove 74 of the seating plate 34 of the stylus 31 to positions corresponding to the upper projecting plate 65A and the lower projecting plate 66A of the stocker 63. The upper and lower projecting plates are inserted into the upper and lower grooves and engaged.

(B) The vertical motion drive mechanism 43 moves the detector 30 in the positive Z direction away from the exchange rack 60. Since the stylus 31 is engaged and cannot be moved in the Z direction, the stylus holder 32 moves in the positive Z direction, leaving the stylus 31 in the stocker 63. The stylus 31 of the detector 30 is now stored in the exchange rack 60.

To attach a new stylus 31 to the stylus holder 32, the rack slider 62 is moved horizontally, the stocker 63 storing the new stylus 31 is brought to the attachment position, and the following operation is performed.

(C) As shown in FIG. 9A, the vertical motion drive mechanism 43 moves the stylus holder 32 in the negative Z direction toward the exchange rack 60. The shaft body 36 of the stylus holder 32 is guided to the center of gravity of the stylus 31, and the seating plate 34 is attached to the flat swinging member 37 of the stylus holder 32. Now, the new stylus 31 is attached to the stylus holder 32.

(D) As shown in FIG. 9B, the first horizontal motion drive mechanism 45 moves the detector 30 in the negative X direction away from the exchange rack 60. The upper projecting plate 65A and the lower projecting plate 66A of the stocker 63 come off from the upper groove 73 and the lower groove 74 of the stylus 31. The stylus 31 is disengaged and taken out of the exchange rack 60.

(E) The vertical motion drive mechanism 43 moves the detector 30 in the positive Z direction back to the original position. Then, the rotational motion drive mechanism 47 turns the detector 30 to have a predetermined orientation, and measurement is performed at a new position.

The stylus 31 can be taken out and stored in the stocker 63, as described above. As well as the standard stylus 31, styluses of different types prepared for different portions to be measured on the workpiece W, such as styluses having different lengths, are stored.

According to this embodiment, when the stylus exchange command is given, the detector drive mechanism 40 drives the stylus holder 32 to relatively move it, and the stylus exchange operation between the stylus holder 32 and the stocker 63 is executed. If the stylus exchange command is given in accordance with the shape of the part to be measured on the workpiece W, the stylus exchange operation between the stylus holder 32 and the stocker 63 is executed automatically. Consequently, the measurement is not interrupted, the burden placed on the operator can be reduced, and the measurement can be made more efficient.

Second Embodiment

Figure 10A:
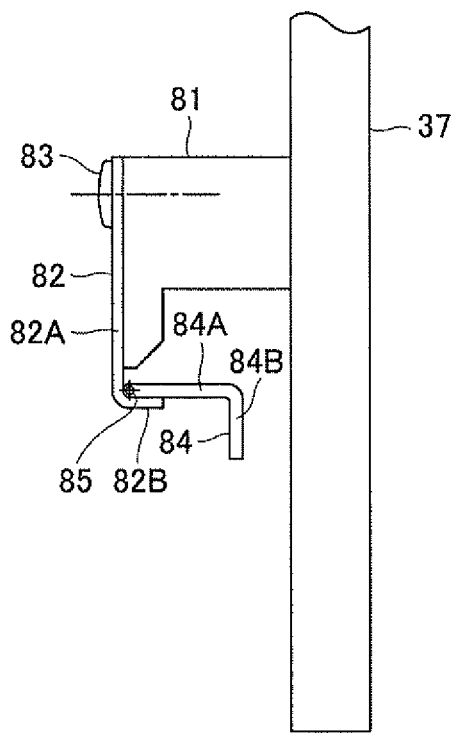
FIGS. 10A and 10B are partial side views of a stylus holder of a detector according to a second embodiment.
Figure 10B:
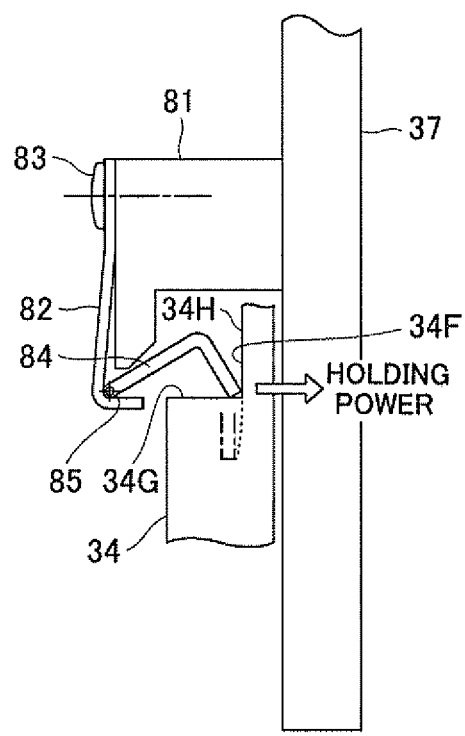

FIGS. 10A and 10B are partial side views of a stylus holder of a detector according to a second embodiment of the present invention. FIG. 10A shows the state before the stylus is attached, and FIG. 10B shows the state after the attachment. FIGS. 10A and 10B correspond to FIGS. 4A and 4B in the first embodiment.

The detector has almost the same configuration as in the first embodiment except for the stylus holding mechanism. An elastic holding member for holding the seating plate 34 of the stylus and a support 81 for supporting the elastic holding member will be described below.

The support 81 is formed continuously from the flat swinging member 37 and extends from the flat swinging member 37 in the longitudinal direction of the shaft body 36. The projecting end of the support 81 has a flat spring 82, which functions as the elastic holding member, with its end fastened by a setscrew 83.

The flat spring 82 has an approximately L-shaped bend and includes a first long spring part 82A and a second short spring part 82B. The elastic deformation of the flat spring 82 generates a holding force that presses the seating plate 34 against the flat swinging member 37, as in the first embodiment.

One end of the first spring part 82A is fixed to the support 81, and the other end extends toward the shaft body 36 (not shown in the figure) disposed below. The second spring part 82B extends from the second end of the first spring part 82A toward the flat swinging member 37. Inside the bend of the flat spring 82, a shaft 85 is disposed parallel to the width direction of the flat swinging member 37. The shaft 85 supports another L-shaped member 84 rotatably.

The L-shaped member 84 includes a first member 84A and a second member 84B and has a greater rigidity than the flat spring 82. One end of the first member 84A of the L-shaped member 84 is supported by the shaft 85. As shown in FIG. 10A, in the state before the stylus is attached, the other end of the first member 84A is parallel to the second spring part 82B of the flat spring 82, and the second member 84B is parallel to the flat swinging member 37.

As in the first embodiment, when the stylus holder is moved to the stylus to attach the stylus, the seating plate 34 is inserted into the space between the flat swinging member 37 and the flat spring 82. Then, the end of the L-shaped member 84 (the end of the second member 84B) comes into contact with the first internal faces 34G formed in the depressed parts 34F of the seating plate 34. The end of the L-shaped member 84 is pressed against the first internal faces 34G and rotates about the shaft 85. When the L-shaped member 84 rotates by a predetermined angle, the end of the second member 84B comes into contact with the second internal faces 34H as well. In other words, the end of the L-shaped member 84 moves to the corner formed by the first internal faces 34G and the second internal faces 34H. If the end of the L-shaped member 84 is pressed further against the first internal faces 34G, the L-shaped member 84 pushes the shaft 85 away from the flat swinging member 37, keeping its L shape. This brings about elastic deformation of the flat spring 82, generating a force to push the shaft 85 back to the original position. This force acts through the L-shaped member 84 to press the seating plate 34 against the flat swinging member 37 and becomes the holding force, as indicated by an arrow in FIG. 10B. Since the stylus holding mechanism forms a toggle joint, as in the first embodiment, the stylus exchange operation is facilitated.

Modifications

In each of the embodiments described earlier, the flat swinging member 37 holds the seating plate 34 detachably by the elastic force of the elastic member. The seating plate 34 may also be detachably coupled to the flat swinging member 37 by a magnet. The seating plate 34 may also be detachably held on the flat swinging member 37 by air suction.

Figure 11A:
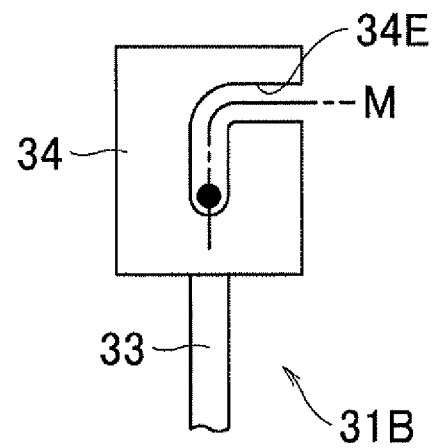
FIGS. 11A and 11B show seatings for different types of styluses according to modifications of the present invention.
Figure 11B:
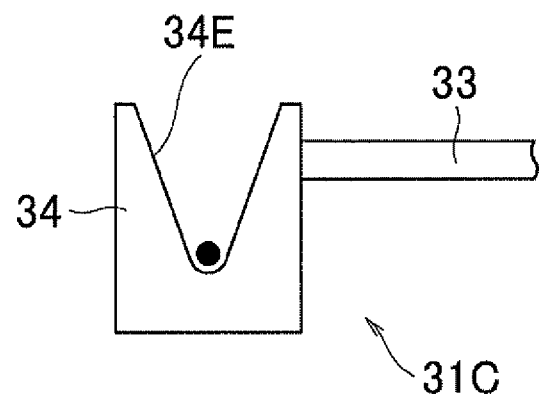

FIGS. 11A and 11B show seating plates 34 for different types of styluses 31B and 31C according to modifications of the present invention. The seating plate 34 may have a notch 34E having a curved central axis M, as in the stylus 31B shown in FIG. 11A, and may also have an approximately V-shaped notch 34E, as in the stylus 31C shown in FIG. 11B.

In the embodiments described earlier, the flat spring 38 or the flat spring 82 is used as the elastic holding member, and the attachment-detachment mechanism is configured as a toggle joint. Different types of elastic holding members may be used to form the toggle joint.

For example, an elastic-force-generating part that includes an elastic member such as a spring plunger may also be used, as the elastic holding member. The spring plunger includes a coil spring, a cylindrical case that accommodates the coil spring, and a movable member that is contained in the case and can advance or retreat in the longitudinal direction. An end of the movable member protrudes from the cylindrical case. When the protruding end is pressed into the case by an external force, the coil spring is compressed, and the resultant repulsive force is applied to the movable member.

When the spring plunger is used instead of the flat spring 38 in the above-described embodiments, and a base end of the spring plunger is rotatably supported as the one end of the flat spring 38, the toggle joint operation is implemented as performed by the flat spring 38. When the end of the movable member is pressed against the seating plate 34, the spring plunger rotates, compressing the coil spring. The movable member should press the seating plate 34 against the flat swinging member 37 by an elastic force generated by the compression.

Third Embodiment

Figure 12:
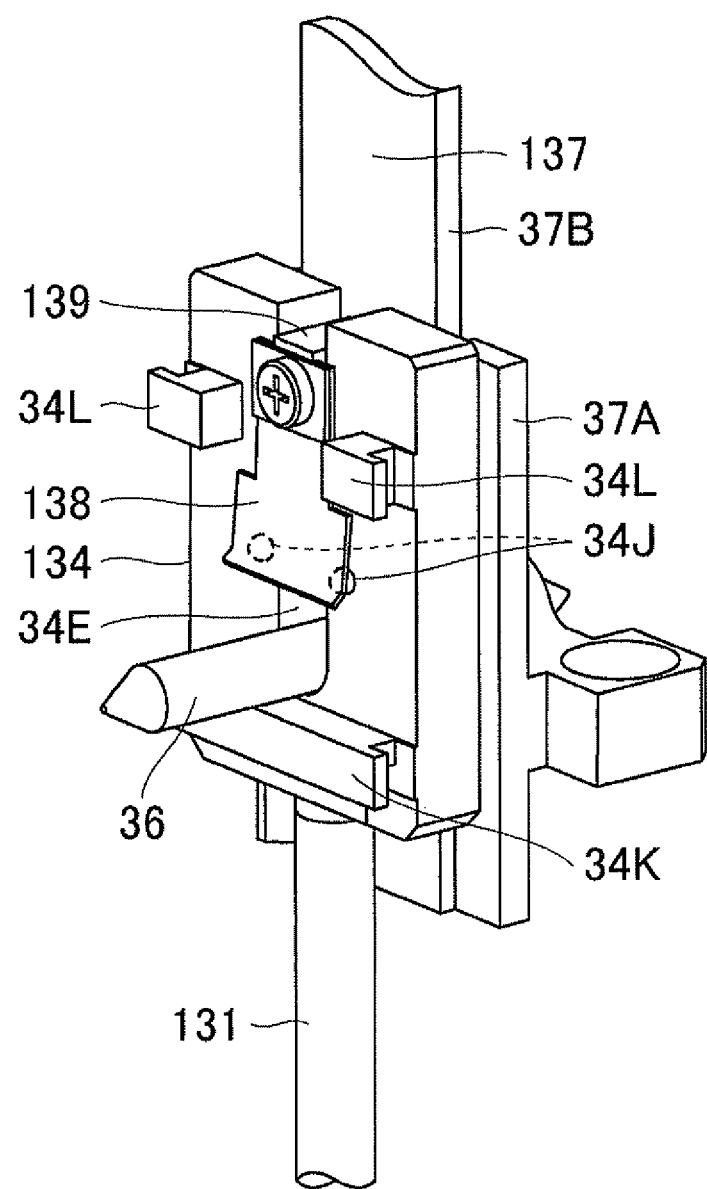
FIG. 12 is a perspective view of a stylus attachment-detachment mechanism of a lever type detector according to a second embodiment of the present invention.
Figure 13A:
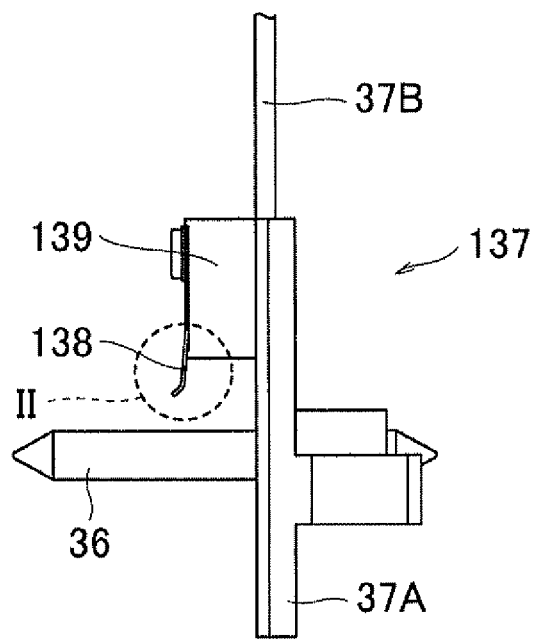
FIG. 13A is a partial side view of the swinging member before the stylus is attached to a stylus holder.
Figure 13B:
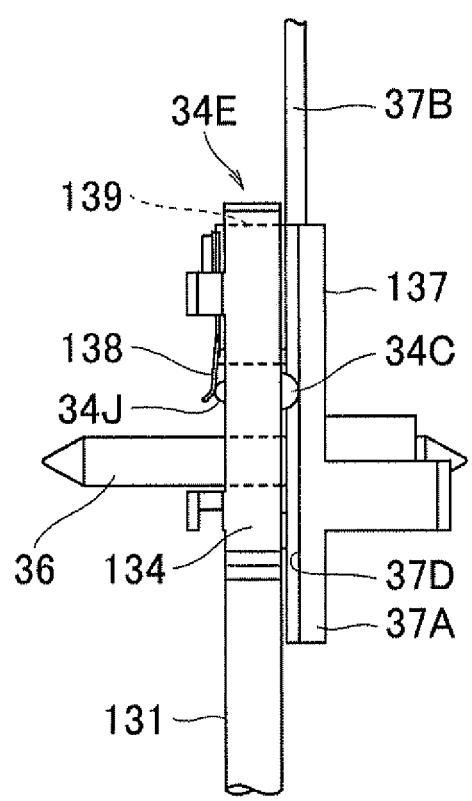
FIG. 13B is a partial side view of the positional relationship between the swinging member and the seating after the stylus is attached.
Figure 14:
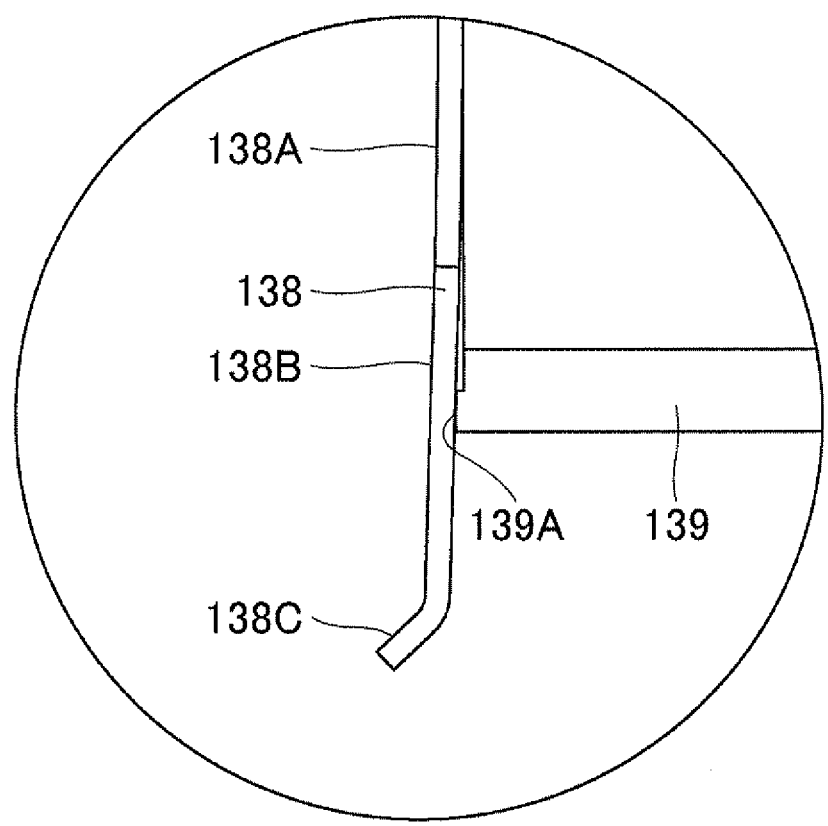
FIG. 14 is enlarged partial side view of an area II in FIG. 13.

In each of the embodiments described earlier, the toggle joint is used as the stylus attachment-detachment mechanism. The stylus attachment-detachment mechanism may also be configured with different types of mechanism as shown in FIGS. 12 to 14, instead of the toggle joint. FIG. 12 is a perspective view of a stylus attachment-detachment mechanism of a lever type detector according to a third embodiment of the present invention. FIG. 13A is a partial side view of a flat swinging member 137 before the stylus is attached to a stylus holder, and FIG. 13B is a partial side view of a positional relationship between the flat swinging member 137 and a seating plate 134 after the stylus is attached. FIG. 13A and FIG. 13B correspond to FIGS. 4A and 4B in the first embodiment. FIG. 14 is enlarged partial side view of an area II in FIG. 13.

The detector has almost the same configuration as in the first embodiment except for the stylus holding mechanism. A flat spring 138 and a flat spring support 139 for supporting the flat spring 138 will be described below. The flat spring 138 is provided for the flat swinging member 137 for holding the seating plate 134 of the stylus 131.

As shown FIG. 12, the flat swinging member 137 includes the wide plate 37A and the narrow plate 37B as in the first embodiment. The shaft body 36 is fixed to the wide plate 37A. The flat spring support 139 is formed continuously from the wide plate 37A of the flat swinging member 137. A position of the flat spring support 139 on the wide plate 37A is closer to the narrow plate 37B than a position of the shaft body 36.

The flat spring support 139 is extended from the wide plate 37A parallel to the longitudinal direction of the shaft body 36. The flat spring 138 is fastened by a setscrew on the extended end of the flat spring support 139, like a cantilever.

The flat spring 138 is screwed to the flat spring support 139 at a base end in the approximately parallel state to the wide plate 37A. A tip end of the flat spring 138 extends toward the shaft body 36. The flat spring 138 has a bend to the outside at the tip end. A width of the tip end of the flat spring 138 is wider than a width of the base end. The width of the tip end of the flat spring 138 is wider than the width P of the notch 34E (see FIG. 7A) of the seating plate 134.

In the state in which the stylus 131 is attached to a stylus holder 132, the wide plate 37A and the seating plate 134 are placed side by side in the longitudinal direction of the shaft body 36. As in the first embodiment, the three positioning balls 34C is provided between the seating plate 134 and the wide plate 37A. The positioning balls 34C function for positioning the seating plate 134, for maintaining the parallel relationship between the seating plate 134 and the flat swinging member 137, and for smoothly guiding the shaft body 36 to a center of gravity of the stylus 131 at the attachment of the stylus 131.

The seating plate 134 has two protrusions 34J protruding forward the flat spring 138. The protrusions 34J are formed on a flat face opposite to a flat face with the positioning balls 34C of the seating plate 134. The notch 34E of the seating plate 134 is located between the two protrusions 34J. Each protrusion 34J includes a single steel ball partially buried in the flat face of the seating plate 134. A cemented carbide ball may also be used for the protrusion 34J as the positioning ball 34C in the first embodiment. In this embodiment, the pair of depressed parts 34F in the first embodiment become unnecessary for the seating plate 134, since the flat spring 138 contacts with the protrusions 34J and holds the stylus 131.

Operation of Stylus Attachment-Detachment Mechanism

A fundamental operation of the attachment-detachment mechanism is common to the first embodiment. Some differences will be mainly described below with reference to FIGS. 13A and 13B. At the attachment of the stylus 131, the shaft body 36 is guided along the notch 34E of the seating plate 134. As in the first embodiment, the shaft body 36 and the flat spring support 139 are placed side by side in a guiding direction for guiding the shaft body 36. As a result, the flat spring support 139 is also inserted into the notch 34E followed the shaft body 36.

Before the shaft body 36 reaches the center of gravity of the stylus 131, a tip of the flat spring 138 (a portion bended to the outside) comes into contact with the protrusions 34J. After that, the flat spring 138 is bended, and the tip of the flat spring 138 is pushed to the outside by the protrusions 34J. In a state in which the shaft body 36 is guided to the center of gravity of the stylus 131, a distance between the wide plate 37A and the tip of the flat spring 138 is bigger than a state before guidance. The elastic force based on the elastic deformation of the flat spring 138 acts through the protrusions 34J to press the seating plate 134 against the flat swinging member 137. Consequently, a holding force for holding the stylus 131 is generated. In this invention, pushing the tip of the flat spring 138 to the outside means pushing in a direction in which the tip end becomes far from the swinging member 137.

According to the present embodiment, because the stylus holding mechanism is configured with the simple flat spring mechanism for attachment-detachment of the stylus, the attachment-detachment mechanism can have a still lower weight, improve steadiness of automatic stylus exchanging and its usefulness.

As shown FIG. 14, a convex part 139A is formed in the extended end of the flat spring support 139 at a position closest to the shaft body 36. The convex part 139A extends slightly more than another part of the flat spring support 139. Therefore in a state in which the flat spring 138 is fastened by a setscrew on the flat spring support 139, the flat spring 138 is elastically deformed slightly to the outside by the convex part 139A. The flat spring 138 is classified into three parts which have a narrow part 138A including its base end and a wide part 138B and a tip end 138C bended to the outside. A position in which the flat spring 138 contacts the convex part 139A is the approximate middle of the wide part 138B.

Because the convex part 139A is provided for the support 139, in the state before stylus attachment, the flat spring 138 is elastically deformed. Therefore when the stylus 131 is attached, the flat spring 138 is elastically deformed still more and the strong elastical force acts against the stylus 131. As a result, although the elastic deformation of the flat spring 138 based on the stylus attachment is slight, a predetermined holding force is generated so as to hold the stylus 131.

Automatic Stylus Exchanger

Figure 15:
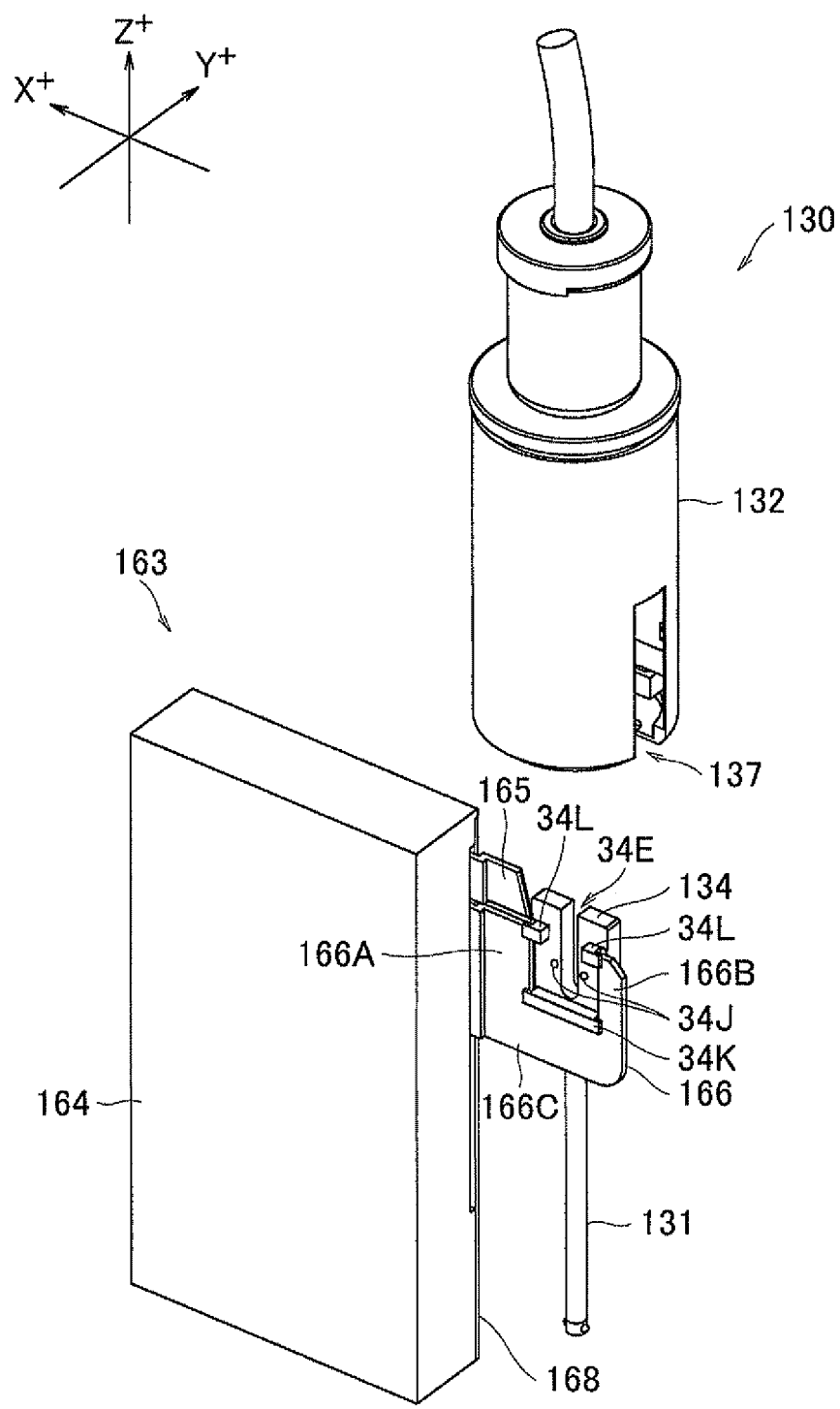
FIG. 15 is a perspective view of the positional relationship between a stocker and a detector before the stylus is taken out of the stocker.
Figure 16A:
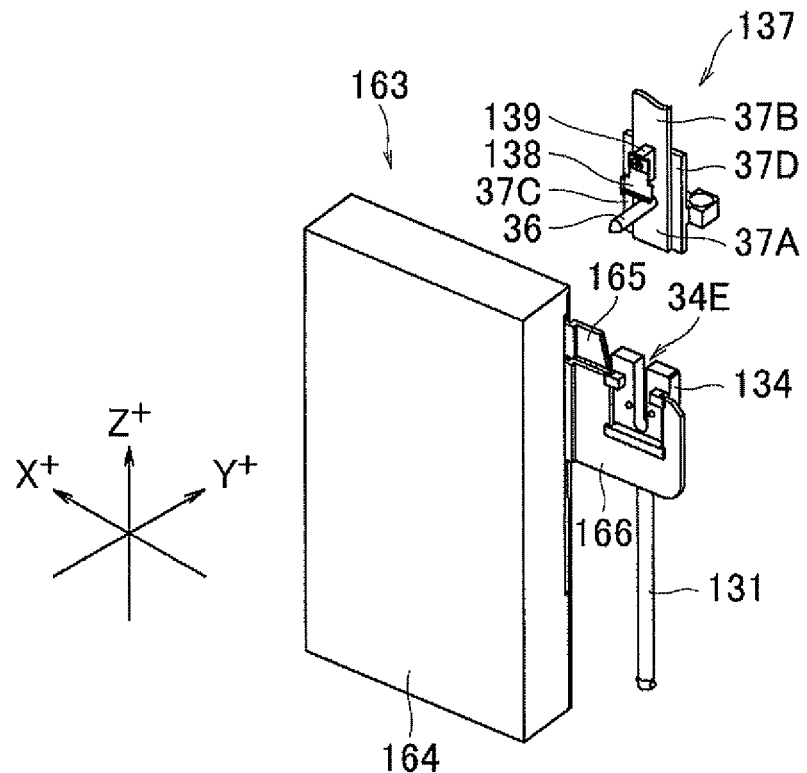
FIGS. 16A to 16C are views illustrating a procedure for exchanging the stylus.
Figure 16B:
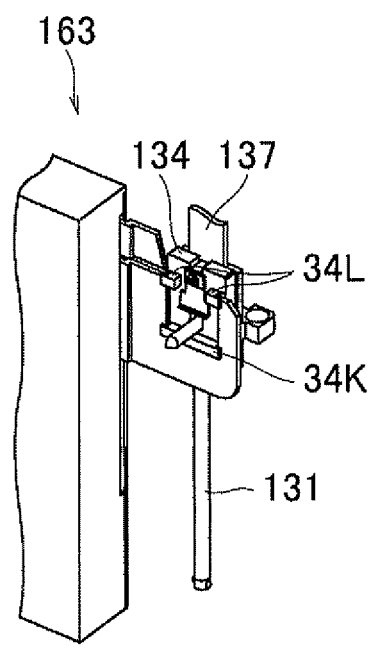
Figure 16C:
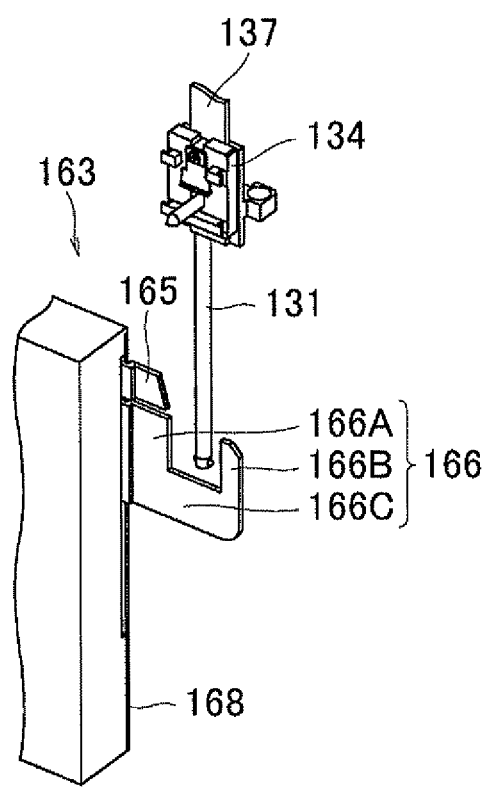

An automatic exchanger of the stylus 131 according to the present embodiment can be used as a roundness measuring machine with the exchange rack 60. The exchange rack 60 has almost the same configuration as in the first embodiment except for a stocker 163. The stocker 163 will be described below with reference to FIGS. 15 to 18. FIG. 15 is a perspective view of a positional relationship between the stocker 163 and the detector 130 before the stylus 131 is taken out of the stocker 163. FIG. 15 corresponds to FIG. 9A in the first embodiment. FIGS. 16A to 16C are views illustrating a procedure for exchanging the stylus 131. FIG. 16A is a perspective view showing a state before the stylus 131 is taken out of the stocker 163. FIG. 16B is a perspective view showing a state in which the stylus 131 is attached to the flat swinging member 137. FIG. 16C is a perspective view showing a state after the stylus 131 is taken out of the stocker 163.

Each stocker 163 includes a rectangular stocker body 164 and an upper support 165 and a lower support 166. The stocker body 164 is configured to move the upper support 165. The upper support 165 forms as a part which can move forward and backward for preventing the stylus from moving in the present invention. The lower support 166 forms as a locked part in the present invention.

The lower support 166 will be described below with reference to FIG. 16C. The lower support 166 projects in the negative X direction from a stocker body 164. The projecting portion of the lower support 166 is formed flatly. In the present embodiment, the flat face of the lower support 166 is parallel to the x-z plane. An approximately square cut portion is provided for the lower support 166 from the positive Z direction edge in the negative Z direction. The lower support 166 is classified into three parts which have an inner side plate 166A and an outer side plate 166B and a lower plate 166C. The cut portion is positioned between the two side plates 166A, 166B. The lower plate 166C is positioned under the cut portion and connects the two side plates 166A, 166B.

As shown in FIG. 15, two upper locking parts 34L having an L-shaped cross section and a single lower locking part 34K are provided for the seating plate 134 of the stylus 131. These locking parts 34L, 34K are respectively formed integrally with the seating plate 134. The notch 34E of the seating plate 134 is positioned between two upper locking parts 34L. A groove extends in the Z direction is formed in the upper locking part 34L so as to lock the side plates 166A, 166B. The lower locking part 34K is formed in the seating plate 134 at a offset position from the notch 34E to the negative Z direction. The lower locking part 34K has three grooves. Two grooves are formed on the sides in the positive and negative X direction. Another groove is formed on the side in the negative Z direction. In other words, two grooves extended in the Z direction lock the side plates 166A, 166B, and one groove extended in the x direction locks the lower plate 166C.

The upper support 165 and the lower support 166 are placed side by side in a Z direction. The upper support 165 projects in the negative X direction from the stocker body 164. A projecting amount of the upper support 165 is approximately same to a projecting amount of the inner side plate 166A of the lower support 166.

Figure 17A:
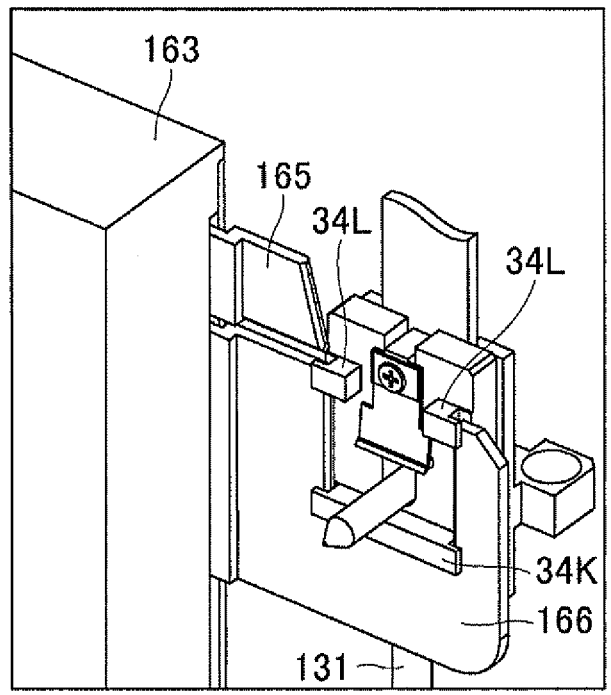
FIGS. 17A and 17B are views illustrating a operation of an upper support of the stocker.
Figure 17B:
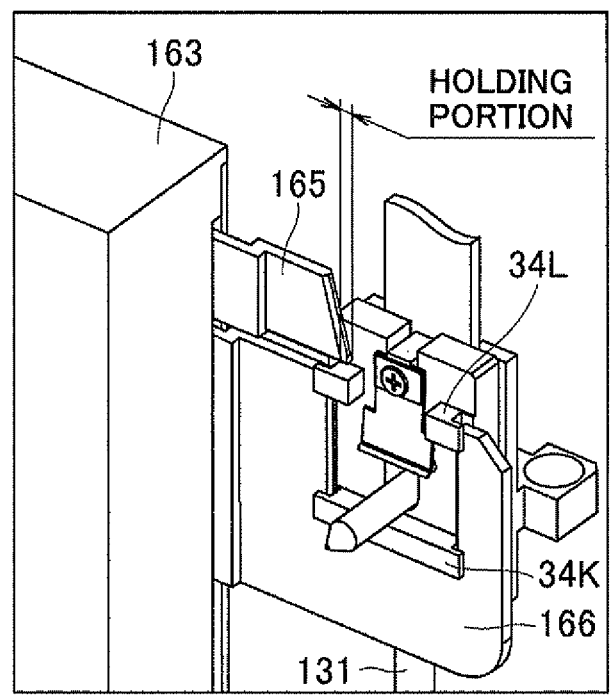
Figure 18:
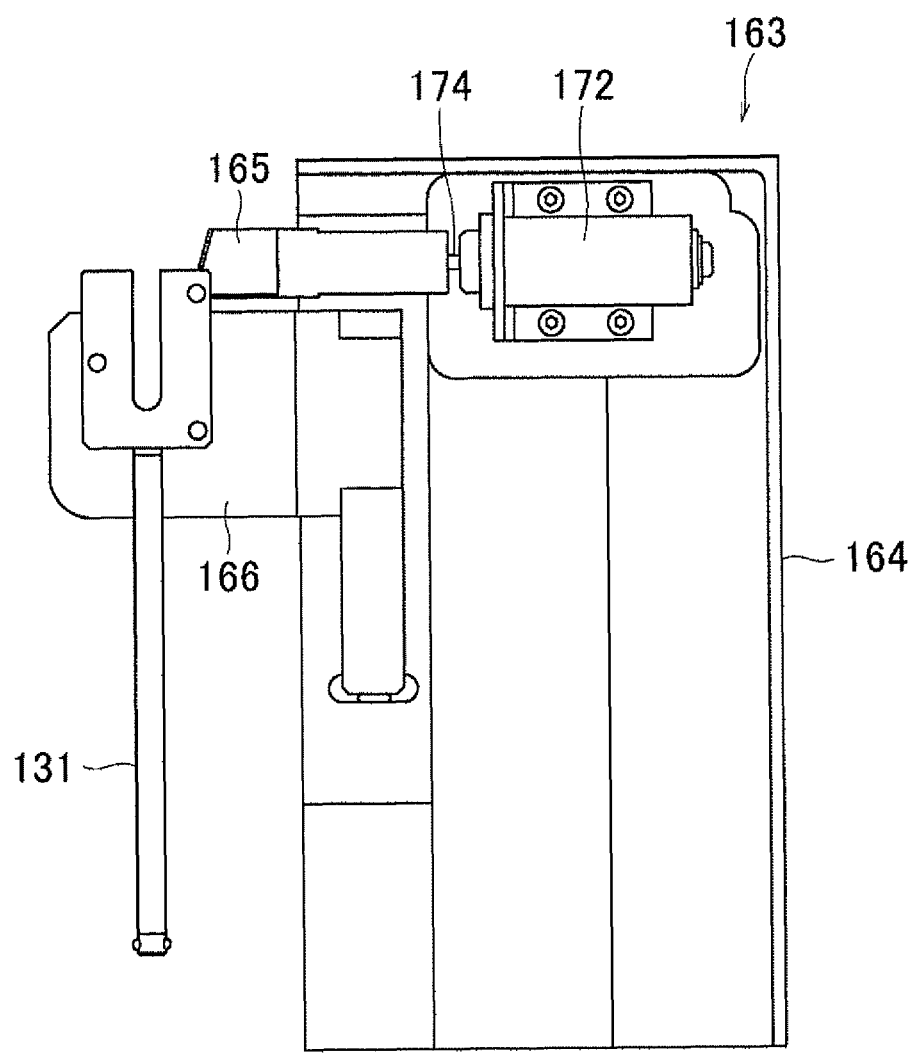
FIG. 18 is a back view showing a driver of the upper support of the stocker.

As shown in FIG. 17, the upper support 165 is formed to advance or retreat in the X direction. FIGS. 17A and 17B are views illustrating an operation of the upper support 165 at the taking the stylus 131 from the stocker 163. FIG. 17A is a perspective view showing the upper support 165 which has moved backward to a releasing position. FIG. 17B is a perspective view showing the upper support 165 which has moved forward to a locking position. FIG. 18 is a back view showing the stocker body 164 without a side cover 168 and showing a driver 172 connecting the upper support 165. The upper support 165 is supported by a tip end of a drive shaft 174 provided for the driver 172 of solenoid type, and can advance or retreat in the X direction. At the locking position, as in FIG. 17B, a tip end of the upper support 165 can lock the upper locking part 34L closer to the stocker body 164. A moving distance of the drive shaft 174 is a few millimeters.

Automatic Stylus Exchange Operation

As in the first embodiment, when the automatic stylus exchange program gives the stylus exchange command to the controller 50, the detector drive mechanism 40 is driven and the stylus exchange operation between the stylus holder 32 and the exchange rack 60 is executed.

As shown in FIG. 15, the lever type detector 130 mounting no stylus is positioned relative to the stylus 131 accommodated in the stocker 163 so that the longitudinal direction of the stylus 131 become same to the central axis of the stylus holder 132.

At the starting of the new stylus attachment, as shown in FIG. 16A, the detector 130 can move in the negative Z direction by the vertical motion drive mechanism 43, so as to approach the stocker 163. The shaft body 36 of the stylus holder 132 is guided to the center of gravity of the stylus 131. Therefore the seating plate 134 is attached to the flat swinging member 137 of the stylus holder 132 (see FIG. 16B).

In the next step, the detector 130 moves in the positive Z direction so as to be far from the exchange rack 60. As a result, the grooves provided for the locking parts 34L, 34K of the stylus 131 release the side plates 166A, 166B and the lower plate 166C of the stocker 163, and the stylus holder 132 can take the stylus 131 from the exchange rack 60 (see FIG. 16C).

When the stocker 163 accommodates the stylus 131, the detector 130 moves as shown in FIG. 16C, 16B, 16A in this order. As shown in FIG. 16B, after the stylus 131 is positioned in an accommodating position of the stocker 163, the upper support 165 moves to the locking position from the releasing position by the driver 172 of solenoid type. After that, the detector 130 moves in the positive Z direction, becomes far from the exchange rack 60 by the vertical motion drive mechanism 43. In this operation, since the upper locking part 34L of the stylus 131 is locked by the tip end of the upper support 165, the stylus 131 is prevented from moving in the Z direction. As a result, the stylus holder 132 moves in the positive Z direction in the state in which the stylus 131 is accommodated in the stocker 163. As the above mentioned operation, the stylus 131 detached from the detector 130 is stored in the exchange rack 60.

As in the present embodiment, the moving direction of the detector 130 in the stylus exchange operation become one direction in the Z direction only. Since the moving in the X direction is unnecessary for the stylus exchange operation, the stylus exchanger can have a still more simplified construction.

The present invention can be applied not only to roundness measuring machines but also to a wide range of surface-property measuring machines, such as surface roughness testers and contour-shape measuring machines.

What is claimed is:
1. A lever-type detector comprising:
a stylus having a contact part that comes into contact with a workpiece;
a stylus holder that supports the stylus swingably;
displacement detection means for detecting a swinging displacement of the stylus in order to measure a surface property of the workpiece;
the stylus comprising a stylus body having the contact part at a tip end and a seating that is disposed in a base end of the stylus body and is detachable from the stylus holder;
the stylus holder comprising (i) a shaft body that serves as the center of swinging of the stylus, and (ii) a swinging member supported by the shaft body;
the seating containing the position of the center of gravity of the whole stylus separated from the stylus holder and having a notch for guiding the shaft body to the center of gravity of the stylus when the stylus is attached; and the shaft body configured to be guided to the center of gravity through the notch, the seating being detachably held by the swinging member, and the stylus becoming swingable about the shaft body.

2. A lever-type detector according to claim 1, wherein the seating of the stylus comprises a counterbalance for adjusting the position of the center of gravity such that the center of gravity of the whole stylus is placed in the notch of the seating.

3. A lever-type detector according to claim 1, further comprising styluses of different types prepared for measurement of different portions of the workpiece,
wherein each of the styluses has a locking part that can lock a part provided for an exchange rack that accommodates the styluses and allows the styluses to be taken out; and
the locking part is disposed in the seating of each of the styluses.

4. An automatic stylus exchanger comprising:
a lever-type detector according to claim 3;
wherein the exchange rack accommodates styluses of different types prepared for different portions to be measured in a workpiece and allows the styluses to be taken out;
a detector drive mechanism for moving the lever-type detector in a direction for approaching or separating from the exchange rack; and
a controller;
when a stylus exchange command is given, the controller controlling the detector drive mechanism and performing a stylus exchange operation between the stylus holder and the exchange rack.

5. An automatic stylus exchanger according to claim 4, wherein the seating of the styluses is flat,
the exchange rack comprises:
a locked part projecting in a moving direction of the lever-type detector in order to guide the stylus locked by the locking part disposed in the seating into an accommodating position when the lever-type detector moves in a direction orthogonal to the direction in which the shaft body is guided to the center of gravity of the stylus on a flat face provided for the seating;
a part for preventing the stylus from moving in the direction in which the shaft body is guided to the center of gravity of the stylus in a state in which the stylus is in the accommodating position; and
whereby only the stylus is accommodated by the exchange rack when the lever-type detector moves in a direction in which the shaft body is guided to the center of gravity of the stylus.

6. An automatic stylus exchanger according to claim 5, wherein the seating of the stylus comprises a counterbalance for adjusting the position of the center of gravity such that the center of gravity of the whole stylus is placed in the notch of the seating;
wherein the counterbalance is disposed in a position offset with respect to the locking part of the seating in the direction of a swinging axis of the shaft body.

7. An automatic stylus exchanger according to claim 4, wherein the seating of the styluses is flat,
the exchange rack comprises:
a locked part projecting in a moving direction of the lever-type detector in order to guide the stylus locked by the locking part disposed in the seating into an accommodating position when the lever-type detector moves in a direction in which the shaft body is guided to the center of gravity of the stylus on a flat face provided for the seating;
a part for preventing the stylus from moving in the direction in which the shaft body is guided to the center of gravity of the stylus in a state in which the stylus is in the accommodating position;
the part is provided so as to move forward and backward between a position for locking the seating in order to prevent the stylus from moving and a position for releasing a lock of the seating; and
the stylus is accommodated by the exchange rack when the lever-type detector moves in a direction in which the shaft body is guided to the center of gravity of the stylus.

8. An automatic stylus exchanger according to claim 7, wherein the seating of the stylus comprises a counterbalance for adjusting the position of the center of gravity such that the center of gravity of the whole stylus is placed in the notch of the seating;
wherein the counterbalance is disposed in a position offset with respect to the locking part of the seating in the direction of a swinging axis of the shaft body.

9. A lever-type detector according to claim 1, wherein
the shaft body is configured to be guided to the center of gravity of the stylus, the swinging member and the seating are placed side by side along the direction of a swinging axis of the shaft body; and
the swinging member comprises an elastic holding member for holding the seating by pressing it against the swinging member with an elastic force and a support for supporting the elastic holding member.

10. A lever-type detector according to claim 9, wherein the elastic holding member is rotatably supported by the support at a base end, and when the stylus is attached to the stylus holder, the elastic holding member is pressed at a tip end by the seating, generates elastic deformation while rotating, and uses the resultant elastic force to hold the seating by pressing it against the swinging member.

11. A lever-type detector according to claim 9, wherein the elastic holding member is cantilevered by the support at a base end, and when the stylus is attached to the stylus holder, the elastic holding member is pressed at a tip end to become far from the swinging member by the seating, generates elastic deformation based on a bend, and uses the resultant elastic force to hold the seating by pressing it against the swinging member.

12. A lever-type detector according to claim 11,
the stylus configured to be attached to the stylus holder,
wherein the seating has the notch located between two protrusions provided for the seating protruding forward the elastic holding member; and
the elastic holding member is flat and cantilevered by the support at a base end, and pressed at a tip end to become far from the swinging member by the protrusions.

13. A lever-type detector according to claim 9,
the stylus configured to be attached to the stylus holder,
wherein the support is extended in the direction of the swinging axis of the shaft body from the swinging member through the notch and supports the elastic holding member at a extended tip end.

14. A lever-type detector according to claim 9, wherein at least three balls are placed between the seating and the swinging member in at least three positions that are not in a straight line, and the balls are used to position the seating with respect to the swinging member in the direction of the swinging axis of the shaft body.

15. A lever-type detector according to claim 14, wherein at least two of the balls are rotatably supported by the seating, and when the stylus is attached to the stylus holder, the balls roll on a groove formed in the swinging member along the direction in which the shaft body is guided to the center of gravity.

* * * * *